(12) United States Patent
Maier et al.

(10) Patent No.: US 11,993,535 B2
(45) Date of Patent: May 28, 2024

(54) FIBER OPTIC TEMPERATURE MEASUREMENT WITH QUANTUM DOT NANOCOMPOSITE

(71) Applicant: LEONI Kabel GmbH, Roth (DE)

(72) Inventors: Claudia Maier, Berlin (DE); Hakan Sayinç, Berlin (DE)

(73) Assignee: Weinert Industries AG, Föritztal (DE)

( * ) Notice: Subject to any disclaimer, the term of this patent is extended or adjusted under 35 U.S.C. 154(b) by 672 days.

(21) Appl. No.: 17/137,484

(22) Filed: Dec. 30, 2020

(65) Prior Publication Data

US 2021/0206689 A1    Jul. 8, 2021

(30) Foreign Application Priority Data

Jan. 3, 2020    (DE) .................... 10 2020 100 058.8

(51) Int. Cl.
| | |
|---|---|
| *G01K 11/32* | (2021.01) |
| *C03C 13/04* | (2006.01) |
| *C03C 25/105* | (2018.01) |
| *C09K 11/02* | (2006.01) |
| *C09K 11/88* | (2006.01) |
| *G01K 11/3206* | (2021.01) |
| *B82Y 15/00* | (2011.01) |
| *B82Y 20/00* | (2011.01) |
| *B82Y 40/00* | (2011.01) |

(52) U.S. Cl.
CPC .......... *C03C 13/046* (2013.01); *C03C 25/105* (2013.01); *C09K 11/02* (2013.01); *C09K 11/883* (2013.01); *G01K 11/3206* (2013.01); *B82Y 15/00* (2013.01); *B82Y 20/00* (2013.01); *B82Y 40/00* (2013.01); *G01K 11/32* (2013.01)

(58) Field of Classification Search
CPC ..... C03C 13/046; C03C 25/105; C09K 11/02; G01K 11/3206; G01K 11/32; B82Y 15/00; B82Y 20/00; B82Y 40/00; G02B 6/0229; G02B 6/2852; G02B 6/02; G02B 6/443; G02B 6/02023; G02B 6/0281; G02B 6/0283; G02B 6/0288; G02B 6/0365
See application file for complete search history.

(56) References Cited

U.S. PATENT DOCUMENTS

| | | |
|---|---|---|
| 4,276,243 A | 6/1981 | Holladay |
| 4,412,853 A | 11/1983 | Partus |
| (Continued) | | |

FOREIGN PATENT DOCUMENTS

| | | |
|---|---|---|
| CN | 1349689 | 5/2002 |
| CN | 101900682 | 12/2010 |
| (Continued) | | |

OTHER PUBLICATIONS

US 6,419,383 B1, 07/2002, Lundin (withdrawn)
(Continued)

*Primary Examiner* — Gail Kaplan Verbitsky
(74) *Attorney, Agent, or Firm* — Williams Mullen; Thomas F. Bergert

(57) ABSTRACT

The invention relates to a method and device for fiber optic temperature measurement. The invention also relates to a multimode quartz glass fiber with nanocomposite (NK) containing a polymer and quantum dots (QDs) and its manufacture. These are based on temperature-dependent emission of quantum dots on the surface of optical fibers.

18 Claims, 7 Drawing Sheets

(56) References Cited

U.S. PATENT DOCUMENTS

Figure 1:
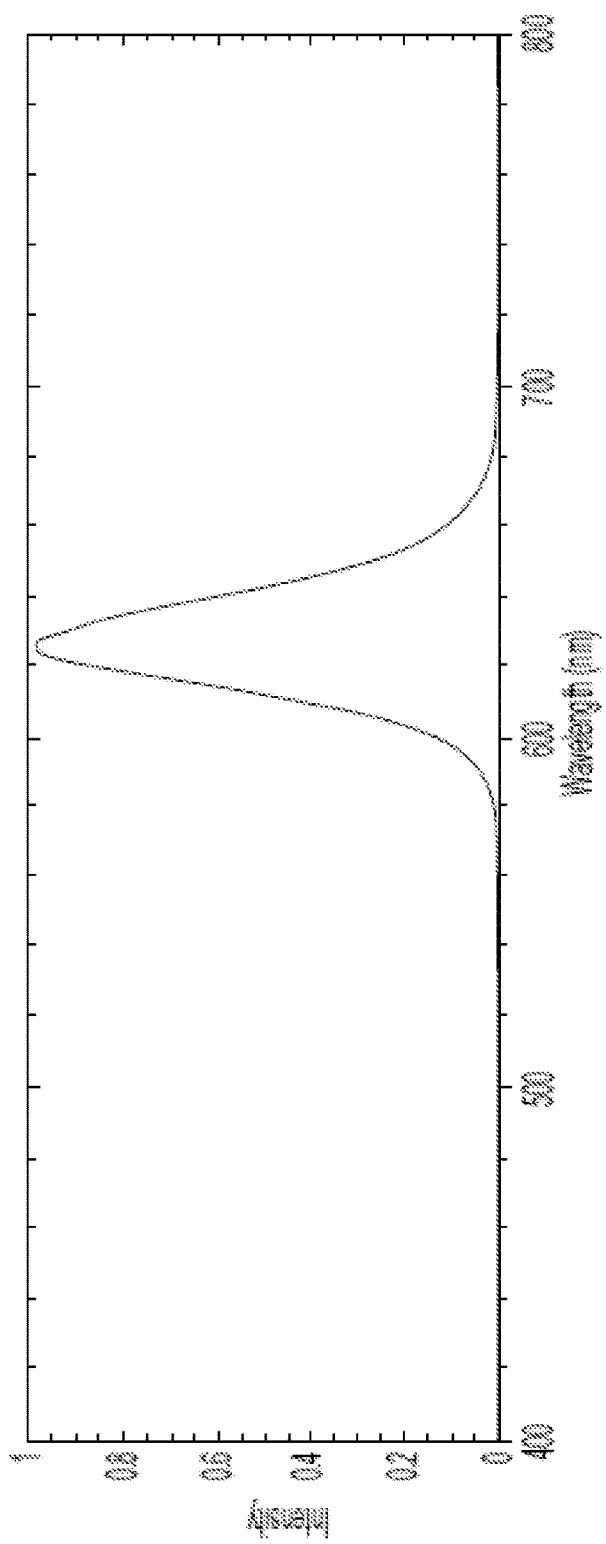

| | | |
|---|---|---|
| 4,582,480 A | 4/1986 | Lynch et al. |
| 5,937,127 A | 8/1999 | Zarian et al. |
| 6,104,857 A | 8/2000 | Ishiharada et al. |
| 6,123,442 A | 9/2000 | Freier et al. |
| 6,169,836 B1 | 1/2001 | Sugiyama et al. |
| 6,234,656 B1 | 5/2001 | Hosseini et al. |
| 6,259,855 B1 | 7/2001 | Lundin |
| 6,301,418 B1 | 10/2001 | Freier et al. |
| 6,367,941 B2 | 4/2002 | Lea et al. |
| 6,519,401 B1 | 2/2003 | Imamura et al. |
| 6,563,993 B1 | 5/2003 | Imamura et al. |
| 6,636,677 B2 | 10/2003 | Hasegawa et al. |
| 6,795,635 B1 | 9/2004 | Fajardo et al. |
| 6,830,366 B2 | 12/2004 | Irie |
| 6,863,428 B2 | 3/2005 | Lundin |
| 7,039,284 B2 | 5/2006 | Nakahara |
| 7,072,552 B2 | 7/2006 | Manyam et al. |
| 7,174,078 B2 | 2/2007 | Libori et al. |
| 7,194,184 B2 | 3/2007 | Buelow, II et al. |
| 7,251,401 B2 | 7/2007 | Singh |
| 7,433,565 B2 | 10/2008 | Joseph et al. |
| 7,437,035 B2 | 10/2008 | Carver et al. |
| 7,437,042 B2 | 10/2008 | Singh |
| 7,444,838 B2 | 11/2008 | Pickrell et al. |
| 7,450,806 B2 | 11/2008 | Bookbinder et al. |
| 7,484,387 B2 | 2/2009 | Hasegawa et al. |
| 7,505,660 B2 | 3/2009 | Bickham et al. |
| 7,526,116 B2 | 4/2009 | Armogida |
| 7,526,169 B2 | 4/2009 | Bickham et al. |
| 7,549,782 B2 | 6/2009 | Ng et al. |
| 7,567,742 B2 | 7/2009 | Pickrell et al. |
| 7,773,846 B2 | 8/2010 | Bickham et al. |
| 7,865,049 B2 | 1/2011 | Singh |
| 7,930,904 B2 | 4/2011 | Bookbinder et al. |
| 8,035,891 B2 | 10/2011 | Goto |
| 8,055,110 B2 | 11/2011 | Coon et al. |
| 8,135,244 B1 | 3/2012 | Sander et al. |
| 8,175,437 B2 | 5/2012 | Bickham et al. |
| 8,331,750 B2 | 12/2012 | Deng et al. |
| 8,459,854 B2 | 6/2013 | Rudek et al. |
| 8,474,287 B2 | 7/2013 | Bickham et al. |
| 8,492,448 B2 | 7/2013 | Dewa et al. |
| 8,582,943 B2 | 11/2013 | Alkemper et al. |
| 8,620,125 B2 | 12/2013 | Button et al. |
| 8,684,578 B2 | 4/2014 | Rudek et al. |
| 8,777,473 B2 | 7/2014 | Schmuck et al. |
| 8,805,141 B2 | 8/2014 | Fewkes et al. |
| 8,861,912 B2 | 10/2014 | Kim et al. |
| 8,926,143 B2 | 1/2015 | Li et al. |
| 8,929,703 B2 | 1/2015 | Logunov et al. |
| 8,983,258 B2 | 3/2015 | Kim et al. |
| 9,025,923 B2 | 5/2015 | Logunov et al. |
| 9,207,397 B2 | 12/2015 | Bennett et al. |
| 9,304,278 B1 | 4/2016 | Bauco et al. |
| 9,373,931 B2 | 6/2016 | Nurmikko et al. |
| RE46,098 E | 8/2016 | Bickham et al. |
| 9,541,694 B2 | 1/2017 | Tissot |
| 9,618,672 B2 | 4/2017 | Kruchinisky et al. |
| 9,628,898 B2 | 4/2017 | Crossland et al. |
| 9,851,500 B2 | 12/2017 | Logunov |
| 9,857,515 B2 | 1/2018 | Tyagi |
| 9,874,671 B2 | 1/2018 | Bauco et al. |
| 9,891,364 B2 | 2/2018 | Tissot |
| 10,175,405 B2 | 1/2019 | Logunov et al. |
| RE47,499 E | 7/2019 | Bickham et al. |
| 2002/0186921 A1 | 12/2002 | Schumacher et al. |
| 2007/0003181 A1 | 1/2007 | Stevens et al. |
| 2008/0297799 A1 | 12/2008 | Caron et al. |
| 2010/0188652 A1 | 7/2010 | Bianchi et al. |
| 2013/0048841 A1 | 2/2013 | Hunt et al. |
| 2013/0308335 A1 | 11/2013 | Genier |
| 2015/0369986 A1 | 12/2015 | Logunov et al. |
| 2017/0115442 A1 | 4/2017 | Dellock et al. |
| 2018/0064322 A1 | 3/2018 | Klubben, III et al. |
| 2019/0310415 A1 | 10/2019 | Logunov |

FOREIGN PATENT DOCUMENTS

| | | | |
|---|---|---|---|
| CN | 102272644 | 12/2011 | |
| CN | 107430241 | 12/2017 | |
| CN | 102692397 | 9/2021 | |
| DE | 69922728 T2 | 12/2005 | |
| EP | 2318835 | 5/2011 | |
| EP | 2664948 | 11/2013 | |
| ES | 2297946 T3 * | 5/2008 | ............ G01K 11/32 |
| KR | 2021007006 A * | 1/2021 | ............ G02B 7/04 |
| RU | 192790 U1 * | 10/2019 | |
| WO | WO-9715969 A2 * | 5/1997 | ............ B82Y 20/00 |
| WO | 2011131724 | 10/2011 | |
| WO | 2016009045 | 1/2016 | |
| WO | 2017087790 | 5/2017 | |
| WO | WO-2022101879 A1 * | 5/2022 | ............ G02B 6/4215 |

OTHER PUBLICATIONS

17137484_2023-11-01_RU_192790_U1_H.pdf, Oct. 2019.*
17137484_2023-11-01_ES_2297946_T3_H.pdf,May 1997.*
17137484_2023-11-01_WO_9715969_A2_H.pdf,May 2008.*
17137484_2023-11-01_KR_20210070006_A_H.pdf,Jan. 2021.*
17137484_2024-03-04_WO_2022101879_A1_H.pdf,May 19, 2022.*
China National Intellectual Property Administration, Chinese First Office Action for CN Application No. 202011625397.5, Aug. 3, 2022.
Stewart, "Optical Fiber and Perform Profiling Technology", IEEE Journal of Quantum Electronics, vol. QE-18, No. 10, pp. 1451-1466, Oct. 1982.
Heraeus, "High Purity Fused Silica Tubes for Specialty Fiber Production", www.heraeus-conamic.com, Apr. 2020.
Sultanova et al., "Refractive Index of Plastics", PMMA/Acrylic Plastics, A 116, 585-587 (2009).
Weidmanni Technologies Germany GMBH—The Way bain ki-Maigfeline—Willkommen—https://web.archive.org/web/20191122031423/http://www.optocon.de:80/willkomme.
Pedro Jorge et al., "Optical Fiber Sensing Using Quantum Dots", Sensors, 7, pp. 3489-3534, Dec. 21, 2007.
P.A. S. Jorge et al., "Self-referenced Intensity Based Optical Fiber Temperature Probes for Luminescent Chemical Sensors Using Quantum Dots", Proc. of SPIE 5855, 17th International Conference on Optical Fibre Sensors, (May 23, 2005).
D. Gloge, "Weakly Guiding Fibers", Applied Optics, Bell Telephone Laboratories, Inc. Crawford Hill Laboratory, pp. 2252-2258, vol. 10, No. 10, Holmdel, New Jersey, Oct. 1971.
S. Wright et al., "A Review of Solid-fluid Selection Options for Optical-based Measurements in a Single-phase Liquid, Two-phase Liquid-liquid and Multiphase Solid-liquid Flows", Exp Fluids, Department of Chemical Engineering, Imperial College London, South Kensington Campus, 58:108, pp. 1-39, London SW7 2AZ, UK, Aug. 2, 2017.
Luvantix ADM, "UV Curable Low Refractive Index Coatings", Optical Solution Provider for Special Fibers, Special Optical Fiber Coating & Adhesives, Low Refractive Index Coatings, Product List, Daejeon, Korea, May 2018.
German Patent Office, German Examination Report, DE 10 2020 100 058.8, Aug. 31, 2020.
Wang et al., "Semiconductor Quantum Dots Surface Modification for Potential Cancer Diagnostic and Therapeutic Applications" Hindawi Journal of Nanomaterials, vol. 2012, Article ID 129041, Oct. 23, 2012.
G. R. Bardajee et al. "Surface Passivation of CdSe-TOPO Quantum Dots by Poly (acrylic acid): Solvent Sensitivity and Photo-induced Emission in Water" Iran Polymer Journal, vol. 22: pp. 885-890, Dec. 2013.
Cheng et al., "Experimental Realization of a PbSe-Quantum-Dot Coped Fiber Laser", IEEE Photonics Technology Letters, vol. 25, Issue 6, pp. 572-575, Mar. 15, 2013.
S. Abrate et al., "Step-Index PMMA Fibers and Their Applications", Intech: Current Developments in Optical Fiber Technology, Chapter 7, p. 178-202, 2013.

(56) References Cited

OTHER PUBLICATIONS

S. Chang et al., "UV Curable Low Refractive Index Clad Coatings for High Power Fiber Laser Applications", Luvantix ADM.
G. Dong et al., "Quantum Dot-doped Glasses and Fibers: Fabrication and Optical Properties", Frontier in Materials, Article 13, vol. 2, pp. 1-14, Feb. 23, 2005.
Gordillo et al., "Color Tuning and White Light by Dispersing CdSe, CdTe and CdS in PMMA Nanocomposite Waveguides", IEEE Photonics Journal, University of Valencia, Spain, 2013.
Chen et al., Colloidal Quantum Dot Random Laser, Optics Express, vol. 19, No. 4 ,Optical Society of America, University of Strathclyde, UK pp. 2996-3003, Feb. 14, 2011.
Bueno et al., "Temperature Sensor Based on Colloidal Quantum Dots—PMMA Nanocomposite Waveguides", IEEE Sensor Journal, vol. 12, No. 10, pp. 3069-3074, Oct. 2012.
N.F. Borelli et al., "Quantum Confinement of PbS Microcrystals in Glass," Journal of Non-Crystalline Solids 180, pp. 25-31, Jun. 21, 1994.
Raine et al. Refractive Index Profiling-State of the Art, Journal of Lightwave Technology, vol. 7, No. 8, pp. 1162-1169, Aug. 1989.
J Beetz, "Manufacture and Characterization Semiconductor Components for the Integrated Quantum Photonics", Dissertation, University Würzburg, pp. 5-6, 2014.
Kahl, Light matter interaction in Festkorper-Nanostrukturen, University Konstanz, Department of Physics, Dissertation, Jul. 7, 2008.
Cargille Laboratories, USA: Catalog #1809, Jan. 15, 2019.

\* cited by examiner

FIBER OPTIC TEMPERATURE MEASUREMENT WITH QUANTUM DOT NANOCOMPOSITE

CROSS-REFERENCE TO RELATED APPLICATIONS

This application claims the priority benefit of German application DE 10 2020 100 058.8 filed on Jan. 3, 2020, which is hereby incorporated herein in its entirety by reference.

The invention relates to a method and device for fiber optic temperature measurement. The invention also relates to a multimode quartz glass fiber with nanocomposite (NK) containing a polymer and quantum dots (QDs) and its production. These are based on temperature-dependent emission of quantum dots on the surface of optical fibers.

BACKGROUND

For many applications, optical temperature measurement (fixed or spatially resolved) offers advantages over electrical measurement and is in some cases indispensable. Some advantages are for example higher accuracy, compatibility with the HV environment, large realizable distances between measuring point and evaluation device and compatibility with optical data transmission in communication networks.

For the following applications, optical temperature measurement is already preferred to electrical temperature measurement:
  Metal oxide varistors as variable resistors for capacitor bank protection (fixed measurement)
  On/Off switches based on physical contact (fixed measurement)
  Medium voltage lines and connection points (depending on location).

Based on condition measurements in critical components and large plants, the intelligent evaluation of large amounts of data and preventive maintenance can help to avoid longer downtimes of large plants. Thus new fiber optic sensors support digital business models.

US 2010/0188652 discloses singlemode fibers coated with a medium containing quantum dots (QDs) applied to a fiber section without cladding. The refractive index of the medium is lower than that of the fiber core ([0044]). In US 2010/0188652, for example, the use of PMMA is proposed for this medium. PMMA has a refractive index of 1.48 (at a wavelength of 436 nm) and is therefore not suitable as cladding material and is not suitable for multimode applications of polymer-coated quartz glass fibers. Furthermore, the materials cannot be cured with UV lamps (Hg vapor lamps, LEDs).

US 2013/0048841 A1 discloses QDs in the cladding or core of an optical fiber. The cladding also has a refractive index that allows light to propagate through the fiber ([0029]). However, the document does not refer to quartz glass fibers with UV-cured polymers in the cladding.

US 2002/186921 A1 discloses QDs in the cladding of an optical fiber, but the cladding does not consist of polymers.

US 2015/0369986 A1 describes diffusely radiating fibers with fiber core and cladding for emitting visible wavelengths, whereby a scattering layer and optionally a phosphor layer is applied to the cladding. The phosphor layer may contain quantum dots, for example. However, the cladding does not contain quantum dots. Furthermore, the nanocomposite containing the QDs is not explained in detail.

Bueno et al ("Temperature Sensor Based on Colloidal Quantum Dots-PMMA Nanocomposite Waveguides") describes planar waveguides with PMMA and QDs (e.g. CdSe and CdTe) cladding, but no multimode quartz glass fiber. As already mentioned, the use of PMMA is not advantageous. The refractive index of PMMA at a wavelength of 436 nm is above 1.49 [1,2,3] and increases with decreasing wavelength. The refractive index of quartz glass is below 1.47 at this wavelength. This means that with PMMA as the cladding no waveguide can be produced that propagates light in the quartz core (condition for total reflection is not given). PMMA is therefore not suitable as cladding material.

The use of quantum dots for optical temperature measurement is proposed in Bueno et al. However, Bueno et al. found a negligible change of the central wavelength for CdSe QDs depending on the ambient temperature (25-50° C.).

Jorge et al ("Optical Fiber Sensing Using Quantum Dots" *Sensors* 2007, 7, 3489-3534) describes a planar waveguide with QD matrix. In this case, the authors report two geometries in the form of a thin film produced by spin coating. In none of the cases a waveguide is mentioned in which QDs are contained. In particular, the generated layer with QDs has no physical contact with an optical fiber. The QDs are located on the "peltiers" and the fibers are only used for the purpose of illumination with the pump wavelength. The light wave propagated in the fiber interacts neither longitudinally (directly at the fiber end) nor transversally (in the cladding) with the QDs. Jorge et al. ("*Self-referenced intensity based optical fiber temperature probes for luminescent chemical sensors using quantum dots*" in Proceedings of SPIE, Volume 5855; 17th International Conference on Optical Fibre Sensors, pages 42-45) describes a measurement setup in reflection arrangement.

From Optocon AK (optocon.de) measuring instruments are available which operate temperature sensors based on gallium arsenide crystal platelets. These crystal platelets have the property that the reflection wavelength changes depending on the temperature. However, here the GaAs is a pure crystal and not a quantum dot. With this measuring method, irradiation with a cost-intensive broadband light source (superluminescent diode, SLD) is required, which must cover the entire wavelength range of the reflection. Depending on the shift of the band edge of the GaAs, the reflected signal of the SLD is shifted in wavelength and measured with a spectrometer. The method is limited to the wavelengths that can be reflected by the GaAs crystal.

The company Photon Control (https://www.photoncontrol.com/technologies/) distributes temperature measuring instruments that use phosphorescent probes in a longitudinal (i.e. front surface) arrangement to the measuring light. The measuring principle is based on the measurement of the decay time of the phosphorescence and is therefore dependent on a temporal pulsing of the exciting pump light and corresponding temporal resolution of the signal. In contrast to this, no phosphorescence signal is measured in the measuring method according to the invention. Therefore, no time-resolved measurement is necessary.

The present invention is based on the use of nanoparticles of semiconductor materials, so-called quantum dots (QDs). These are also known as "artificial atoms" because the inclusion of charge carriers on the length scale of their de Broglie wavelength results in a quantization of energy levels.

The use of QDs in side-radiating fibers to illuminate them was previously reported in US 2015/0369986 A1. It is mentioned that a phosphorescent layer may contain QDs, wherein this phosphorescent layer is deposited on a reflective layer ("scattering layer"), which in turn is deposited on a cladding layer. The cladding layer itself is deposited on the fiber core with scattering defects. The nanocomposite containing the QDs is not explained in detail. A functionalization of the nanocomposite with regard to a conversion from one defined wavelength to another defined wavelength is also not mentioned.

Different resonator geometries in nanostructured solids containing QDs have already been investigated in the literature. With this respect, the goal is to prove laser activity by embedding into a laser resonator. Beetz, ("Herstellung and Charakterisierung von Halbleiterbauelementen für die integrierte Quantenphotonik", Dissertation Uni Würzburg (2014)) realized an optical by means of a photonic crystal (light conducting 2D structure), wherein QDs are located in the core of the waveguide (see summary on pages 5 and 6).

While previously reported laser activity was limited by multi-excitonic Auger recombination, Nurmiko and his colleagues were able to demonstrate a laser gain based on single excitons. In 1994, Borrelli et al. were the first group to introduce QDs in prefoms for optical fibers using the "glass melt-quentching method". This paved the way for QD-doped active optical fibers for further work (see G. Dong et al. and Borelli et al.).

Embedding in a nanocomposite is another possibility to generate a laser active medium which is inserted into a laser resonator. Gordillo et al. have demonstrated nanocomposites consisting of CdS, CdTe and CdSe nanoparticles and a matrix of PMMA (Gordillo, "Color Tuning and White Light by Dispersing CdSe, CdTe, and CdS in PMMA Nanocomposite Waveguides," IEEE Photonics Journal (2013)). The nanocomposite film was produced by spincoating and baked to cure. The laser active medium had a planar waveguide geometry. The medium was located in a laser cavity and was excited with a pulsed UV laser. The result was a proven laser operation.

The purpose of the present invention is to create a new possibility for optical temperature measurement based on fiber optic sensors. The invention solves the problem for a specific −273 K to 474 K, i.e. 0° C. to 200° C.

SUMMARY

In one embodiment of the present invention, a multimode quartz glass fiber with a nanocomposite with polymer(s) and QDs as cladding is provided (herein also referred to as the embodiment "nanocomposite as cladding" or "transverse embodiment" because the QDs are arranged transversely to the pump light propagating in the fiber core). In this embodiment, it is possible to excite the quantum dots in the cladding, for example to perform a local temperature measurement in the fiber sheathing.

An advantage of QDs in cladding is that the QDs are electrically isolated and are not affected by fields in the HV environment. Since very small amounts of QDs are sufficient, it is possible to work cost-effectively. Furthermore, the nanocomposite can be formed into a desired three-dimensional shape. Low-cost light sources (LED/USB laser diode) can also be used as pump light.

The present invention enables, in particular due to the low refractive index of the cladding, the production of low-loss waveguides. In addition, the production is particularly advantageous because the acrylates used can be cured quickly and economically with UV lamps (Hg vapor lamps, LEDs).

The fluorinated acrylates preferred in accordance with the invention have a refractive index that is significantly lower than that of quartz glass (approx. 1.404). The advantage is therefore that the polymers used in the invention can be used to produce a quartz glass waveguide that is not susceptible to bending.

The quartz glass fiber according to the invention should be suitable for transmission of very high laser powers, especially in the range between 970 nm and 2000 nm (S. Chang—UV curable Low Refractive Index Clad Coatings for High Power Fiber). One limitation is that the laser wavelength must be away from the absorption wavelength of the QDs. The advantage, thus, is that the quartz glass fiber fulfills two functions in one waveguide: Beam transport and conversion from blue to red.

The quartz glass fiber according to the invention is also well suited to transmit both the pump wavelength (400-450 nm) and the signal wavelength (580-680 nm) with low loss (except for the converted light portion) over long distances (~5×10^2 m, loss 0.5-1 dB/m), where the signal wavelength is the central wavelength emitted by the quantum dots. The manufactured fiber is suitable for transmitting optical signals in a large wavelength window (400 nm-2000 nm). The reason for this is that silica glass has a very low absorption in this wavelength window. In contrast, a PMMA waveguide has a very high attenuation above 700 nm (>1 dB)/m and is not suitable for wavelengths above that (see S. Abrate—Step Index PMMA Fibers and Their Applications (page 183)). This has two consequences: 1) a multifunctionality of the waveguide (beam transport between 970 nm-2000 nm+conversion) is not possible with PMMA; 2) If QDs made of other materials with emission>700 nm are chosen (e.g. InAs/InP emission at 1550 nm), it is not possible to observe conversion due to the poor transmission. Accordingly, neither a waveguide nor a point sensor can be manufactured with InAs/InP based nanocomposite. The essential part of the pump radiation (e.g. 1060 nm) would be absorbed. With the invention's quartz glass fibers in combination with the preferred fluorinated acrylates in the cladding, there are no restrictions whatsoever. The fluorinated acrylates also provide good mechanical protection of the glass fiber core.

With the present invention it is also possible to combine the QDs with a polymer matrix in such a way that the pump wavelength/signal wavelength and the geometry and concentration/dilution of the QDs can be freely selected. The selection can be made according to the QD material to be used, which would then determine the pump wavelength/signal wavelength. The length of the waveguide at which a conversion is desired together with the available pump power would lead to a determination of the concentration/dilution.

The provision of multimode quartz glass fibers in accordance with the invention is also advantageous. In singlemode fibers, low-order modes interact only slightly with the QDs, while evanescent fields of higher transverse modes in multimode fibers have a greater penetration depth and thus interact more strongly with QD (D. Gloge—Weakly guiding fibers). According to the invention, a selective interaction with QDs can be achieved by selectively exciting the transverse modes of a fiber.

In a further embodiment of the present invention, a quartz glass fiber is provided with a nanocomposite having QDs on the front surface of the quartz glass fiber or between two front surfaces of two quartz glass fiber sections (herein also referred to as embodiment "nanocomposite on fiber front surface" or "longitudinal embodiment", since the QDs are arranged longitudinally or in the beam path of the pump light propagating in the fiber core). In these embodiments it is possible to perform a local temperature measurement on this/these front surface(s). Thus a very compact point sensor (>2 mm) can be produced.

In a preferred embodiment, the nanocomposite material is introduced into a cylindrical capillary and then brought into contact with the quartz glass fiber front surface(s).

As shown in the publication by D. Gloge, evanescent fields of different transverse modes penetrate the nanocomposite to varying degrees. The higher the mode, the stronger the interaction with the nanocomposite. The advantage of a multimode fiber is that a transversal mode can be excited by a specific coupling with a corresponding maximum mode overlap, which either interacts very weakly or very strongly with the nanocomposite. This is an advantage of multimode embodiment. The light coupling in transverse modes can also be differentiated by wavelength. For example, while 400 nm is coupled into the lowest transverse mode and causes almost no conversion, the wavelength 450 nm can be coupled into the highest possible transverse mode of the present fiber to provoke a strong conversion. Thus different signals can be transmitted/converted, multiplexed in a very specific way. A compensation of the power between the transverse modes (transverse mode coupling) typically occurs only after many meters fiber length.

A further advantage of the present invention is that UV-curing polymers can be used for the nanocomposite. The curing of the nanocomposite, which can be applied to fibers on fiber drawing towers, for example, can then be carried out using UV lamps. UV curing thus enables a scalable commercial process for the cost-effective production of a quartz glass fiber with quantum dots containing nanocomposite at high process speed. Thermal curing is also conceivable if silicone or polyimide is used. Silicone is also suitable because of its low refractive index. Polyimide, on the other hand, can be used up to 360° C. as a coating. Thus, one possible embodiment also concerns a multimode quartz glass fiber as described herein, where the one or more UV-cured polymers are replaced by thermally cured polymers, preferably containing or consisting of polyimide or silicone.

In addition, a number of process engineering difficulties had to be overcome in the production of the quartz glass fibers in accordance with the invention. For example, the mixing of the polymers and the QDs during production must be carried out in such a way that no lumps are formed. This can be achieved by suitable stirring techniques. The mixture produced must also be processed quickly to prevent the QDs from clumping or segregating. When the nanocomposite is applied to the fiber core, the glass surface must not be too hot or too cold in order to enable problem-free adhesion of the nanocomposite to the surface. Also, the speed at which the fiber is pulled out of the preform and at which the NK is applied to the surface must not be too high, otherwise air pockets will occur between the glass and the coating. These lead to mechanical instability of the fiber. Therefore, the step of glass melting while drawing the fiber, the step of applying the nanocomposite onto the fiber core and the process of UV curing must be coordinated, which means that the NK and the fiber core should have a similar temperature or the same temperature +/−20° C. It has also proven to be more advantageous if the nanocomposite as a cladding is brought to a defined temperature before application.

According to the embodiment "nanocomposite as cladding", the QDs are combined directly with the fiber core/waveguide in the form of a cladding and have direct contact with the evanescent field of the pump light. For this purpose, it was necessary to develop a cladding process that is compatible with a quartz glass fiber production. Known processes, such as a "sol-gel process" as described in Jorge et al. ("Optical Fiber Sensing Using Quantum Dots" *Sensors* 2007, 7, 3489-3534) are not used in fiber manufacturing and are not readily compatible.

For the embodiment "nanocomposite on fiber front surface" of the invention, it was a challenge to apply the QDs directly to the fiber end. For this purpose, the QDs had to be introduced into a UV-curing polymer matrix. Subsequently, the now UV-curing nanocomposite was introduced into a quartz glass capillary and a quartz glass fiber was inserted into the capillary. When irradiated with UV light, the NK, the quartz glass capillary and the quartz glass fiber could be joined together in a single step without adjustment.

The shape of the nanocomposite (herein also "NK") is freely selectable in the application according to the invention, since it is cured from a liquid state. The NK can, for example, be cured in a cylindrical form by means of UV light (the capillary serves as a shaping boundary). By a smart selection of the refractive indices of the polymer (fluorinated acrylates are preferred here) and the capillary (e.g. quartz glass with fluorine doping or silicone, for example with a refractive index of <1.37) in relation to the refractive index of the quartz glass core, the short section in which the light field propagates in the nanocomposite (which is arranged at the front surface of the quartz glass fiber) can even act as a waveguide. Thus the NK can even be used as a waveguide core. Optionally, the refractive index of the polymer can also be chosen to be greater than that of the capillary if a longer distance is to be realized (>2 mm). Within the scope of the present invention, it is in principle possible to freely select the type of quantum dots, since there should be no negative interactions with the polymers of the nanocomposites. One reason for this is that core-shell QDs can be used, whose fluorescent properties are protected from the outside by the shell.

Furthermore, two pumping geometries (excitation geometries) are possible:

longitudinal (in the direction of light propagation in the fiber core) and transverse (transverse to the direction of light propagation in the core). Depending on the selected pump geometry, the parameters layer thickness of the claddings and concentration of the QDs in the polymer matrix have to be adjusted.

By combining QDs with a polymer matrix that has a defined refractive index, the nanocomposite can be used both as a waveguide sheating (refractive index polymer<refractive index quartz glass) and as a waveguide core (refractive index polymer>refractive index quartz glass).

DETAILED DESCRIPTION

The invention relates to the following forms of execution:
1. Multimode quartz glass fiber, comprising:
a) a fiber core of quartz glass,
b) a cladding layer, and
c) a nanocomposite material containing one or more, preferably UV-cured, polymers and one or more types of quantum dots capable of emitting one or more central wavelengths;
and wherein the nanocomposite is either
i) forms the cladding layer, wherein the cladding layer is applied directly onto the fiber core, wherein the nanocomposite has a lower refractive index at the central wavelength of the quantum dots or at one of the central wavelengths than the quartz glass of the fiber core, at this central wavelength (here the refractive indices refer to the finished multimode quartz glass fiber or are determined on the multimode quartz glass fiber, preferably at 25° C.); or ii) is formed on the front surface (i.e. cross-sectionally) at one end of the quartz glass fiber or on the front surface between two sections of the quartz glass fiber, the nanocomposite preferably having a refractive index of less than 1.2 times that of quartz glass at the central wavelength of the quantum dots, or one of the central wavelengths if there are several central wavelengths (measured at this central wavelength on the multimode quartz glass fiber).

In a preferred embodiment of (i) or (ii), the nanocomposite exhibits a refractive index below 1.457 (refractive index of quartz glass at 630 nm) at the central wavelength of the quantum dots, preferably at 630 nm, with the measurement being performed on the multimode quartz glass fiber; or the nanocomposite has a refractive index below 1.444 (refractive index of quartz glass at 1550 nm) at the central wavelength of the quantum dots, preferably at 1550 nm, the measurement being made on the multimode quartz glass fiber, preferably at 25° C.

In a preferred embodiment of (ii), the nanocomposite exhibits a refractive index of 1.3-1.8 at the central wavelength of the quantum dots, preferably at 630 nm, with the measurement being performed on the multimode quartz glass fiber.

The expression "one or more types of quantum dots" means that quantum dots of different chemical composition or different particle size may be present. A multitude of quantum dots with similar particle size and same composition will emit a central wavelength according to the particle size distribution in the excited state.

Quartz glass consists of pure silicon dioxide ($SiO_2$). The refractive index of the fiber core is therefore preferably 1.44-1.48 (for pump/signal wavelengths at 300 nm to 1550 nm, for example for cadmium and indium based Qds). One method to determine the refractive index is the "Refracted Nearfield Measurement" (RNF) (see Raine et al. "Refractive Index Profiling—State of the Art", Journal of Lightwave Technology, Volume 7, No. 9, August 1989, pages 1162-1169). Such a measurement can be carried out, for example, with the "S14 Refractive Index Profiler" measuring instrument from Photon Kinetics, Inc., USA. Here, the RNF method is used to determine the refractive index at a measuring wavelength that is not absorbed by the nanocomposite. For the present invention it is preferred that the measuring wavelength is not in the range 300-500 nm or 1000-1300 nm. The measurement is performed in a measuring cell containing a liquid with a known refractive index, e.g. an oil with a refractive index of 1,470 at 20° C., preferably the UCON™ oil—50 HB 5100 (polyalkylene glycol) from Dow Performance Lubricants (see Wright et al. "A review of solid-fluid selection options for optical-based measurements in single-phase liquid, two-phase liquid-liquid and multiphase solid-liquid flows", Exp Fluids (2017) 58:108) or an oil from Cargille Laboratories, USA, with a refractive index of 1.470 at 589.3 nm (Catalog #1809, Aliphatic/Alicyclic Hydrocarbons and Hydrogenated Terphenyl, Series A). The refractive index of the oil must be greater than that of the cladding and nanocomposite, respectively. The fiber to be measured is placed in the center of this measuring cell, flush with the bottom. The measuring cell is then scanned from below with a HeNe laser and the refracted rays are detected. The measurement result is a refractive index difference between liquid, cladding/nanocomposite and fiber core. Based on the measurement data and the refractive index of the liquid, the refractive index of the quartz glass and the nanocomposite can be determined at the desired central wavelength or it can be determined whether the refractive index of the nanocomposite is lower than that of the quartz glass. The index of the liquid for the measurement can be determined with an Abbe refractometer, for example an AR4 Abbe refractometer from A. KRÜSS Optronic GmbH, Hamburg (LED with wavelength 589 nm). An Abbe refractometer (see above) can be used to determine the refractive index of the frontally arranged NK.

The multimode quartz glass fiber is an optical quartz glass fiber (or "quartz fiber" or "glass fiber" for short). It preferably contains no scattering defects. Preferably, the multimode quartz glass fiber also does not contain a scattering layer containing scattering material, for example nano- or microparticles for light scattering, which is applied to the cladding layer. In addition, the multimode quartz glass fiber preferably does not contain scattering material embedded in the cladding layer.

2. The multimode quartz glass fiber according to embodiment 1, where the refractive index of the cladding layer is smaller than the refractive index of the fiber core, preferably the refractive index of the fiber core is 1.46-1.47 and the refractive index of the cladding layer is 1.37-1.45 preferably 1.404 or smaller, determined by measurement of the numerical aperture according to DIN standard EN 60793-1-43 VDE 0888-243:2015-12 Optical fiber to enable the preferred desired wavelength of 250 to 2400 nm.

According to the invention, the refractive index can be selected in such a way that a waveguide is possible at the desired wavelength.

3. The multimode quartz glass fiber according to one of the preceding embodiment, wherein the nanocomposite comprises or consists of polymers, preferably in an amount of 80-99.5 weight percent, based on the total weight of the nanocomposite quantum dots, preferably in an amount of 0.5-15 weight percent, based on the total weight of the nanocomposite, optional additives, preferably in an amount of 0-10 weight percent, based on the total weight of the nanocomposite.

Preferably, the polymers comprise at least 90% by weight of UV-cured polymers, more preferably 99 or 100% by weight based on the weight of the nanocomposite. Thus the nanocomposite contains exclusively UV-cured polymers in a particularly preferred embodiment. The term "UV-cured polymers" means that the nanocomposite is applied to the fiber core in a viscous form during production and then cured by means of UV radiation.

4. The multimode quartz glass fiber according to any of the foregoing embodiments, where the (UV-cured) polymer(s) is (are) selected from the group consisting of fluoroacrylate-based polymers (i.e. polymers with an acrylate or methyl acrylate anion motif, in particular acrylate esters or methacrylate esters, for example methyl acrylate-based polymers), urethane acrylate-based polymers; fluorosiloxanes; epoxy-acrylate-based polymers, polyester-acrylate-based polymers, urethane-acrylate-based polymers, silicone-acrylate-based polymers, acrylic-acrylate-based polymers, polymethylsiloxane, polydimethylsiloxane, polyimide, fluorinated urethanes, and copolymers and blends thereof, more preferably UV curable polymers selected from fluoroacrylate based polymers, methyl acrylate based polymers, epoxy acrylate based polymers, polymethylsiloxane, and polydimethylsiloxane especially preferred are fluoroacrylate-based polymers, urethane-acrylate-based polymers; and fluorosiloxanes;

and most preferably the polymer matrix is selected from fluoroacrylate-based polymers, for example a multifunctional prepolymer of 2-(perfluorohexyl)ethyl methacrylate, 2-propenoic acid, 2-methyl, 2-ethyl-2-[[(2-methyl-1-oxo-2-propenyl)oxy]methyl]-1,3-propanediyl ester, phenol; and polyperfluoroethoxymethoxy-difluoro-ethyl PEG ether.

As described in US 2010/0188652, the refractive index of the polymers listed here can be modified to meet the desired requirement, for example, if the pure polymer has a too high refractive index.

According to the invention, a nanocomposite material (also "NK" or "nanocomposite") is used.

According to the invention, fluorinated polymers are preferred, whereby fluorinated variants of all polymers mentioned herein are particularly preferred.

5. The multimode quartz glass fiber according to one of the previous embodiments, where the quantum dots are combinations of group II-VI elements (especially zinc or cadmium with oxygen, sulfur, selenium, tellurium), III-V elements (especially boron or aluminum or gallium or indium with nitrogen, phosphorus, arsenic, antimony, or bismuth), or IV-VI elements (especially silicon or lead with selenium or sulfur) of the periodic table and mixtures of these combinations, preferably selected from the group consisting of CdSe, ZnCdS, CdTe, PbS, PbSe, core-shell quantum dots (CdS/ZnSe, CdSe/CdS, CdSe/ZnCdS, CdSeS/ZnS, InP/ZnS), Core-shell-shell quantum dots (CdSe/CdS/ZnS, CdTe/CdS/ZnS), InP, ZnSe, ZnxCd1-xSe, CdTexSe1-x, CdS and perovskite QDs.

Colloidal CQDs are also suitable, especially colloidal CdSe/ZnxCd$_{1-x}$S core-shell quantum dots.

6. The multimode quartz glass fiber according to any of the foregoing embodiments, where the polymer matrix without QDs has an elastic modulus of 180 to 220 MPa, measured according to Standard D638-14 of the American Society for Testing and Materials.

In the "nanocomposite on front surface" embodiment, the quartz fiber can be designed for transmission or reflection measurement.

In the transmission case:

The transmission of the NK must be distinguished for the pump wavelength and the signal wavelength.

Pump wavelength: the polymer matrix must have the highest possible transmission to minimize the loss of pump power. The number of QDs should be chosen so that the entire pump power is absorbed with the existing number of QDs.

Signal wavelength: the polymer matrix should have the highest possible transmission to minimize signal losses. The number of QDs should be chosen to minimize the reabsorption of the signal wavelength (if physically possible with the chosen QDs).

The elastic modulus of the polymer matrix is important for the cladding layer to provide sufficient mechanical protection for the fiber core. In the course of the invention it was shown that the elastic modulus of must be neither too high nor too low.

7. The multimode quartz glass fiber according to any of the foregoing embodiments, wherein the fiber core of the multimode quartz glass fiber is characterized by having a V-parameter greater than 2.405 so that more than one transverse mode can be guided per polarization.

The V-parameter is determined by determining the refractive index of the cladding and applying the formula for calculating the V-parameter. The refractive index of the cladding can be determined using the "Refracted Nearfield Method" (see Raine et al. 1989 or the literature of Steward et al. referenced therein).

8. The multimode quartz glass fiber according to one of the preceding embodiments, where the quantum dots are distributed homogeneously and/or non-agglomerated in the polymer matrix, and/or where the concentration of the quantum dots in the nanocomposite is 0.001 to 10%.

9. The multimode quartz glass fiber according to one of the previous embodiments, where the quantum dots are CdSe/CdS core-shell quantum dots.

Various types of quantum dots are commercially available, for example from Quantum Solutions (https://quantum-solutions.com/products-portfolio/quantum-dots/), Merck/Sigma-Aldrich (https://www.sigmaaldrich.com/materials-science/material-science-products.html?TablePage=16376883), or PlasmaChem (http://www.plasmachem.com/shop/en/26-quantum-dots).

10. The multimode quartz glass fiber according to one of the previous embodiments, where the quantum dots have a size of 1 nm to 1 μm. The size of the quantum dots can be determined, for example, as D95 by volumetric dynamic laser light scattering, preferably using a device from Malvern Instruments, Ltd, Malvern, UK, preferably a Zetasizer Nano.

The quantum dots must have a suitable size to ensure absorption and emission at the desired wavelength.

11. The multimode quartz glass fiber according to one of the previous embodiments, with the cladding layer completely or partially enveloping the fiber core.

12. The multimode quartz glass fiber according to one of the previous embodiments, where the fiber core has a diameter of 20 μm to 2 mm.

In the "nanocomposite as cladding" embodiment, the preferred diameter of the fiber core is 30-600 μm, more preferably about 50 μm. For the "nanocomposite on fiber front surface" embodiment, the preferred diameter of the fiber core is 200-800 μm, preferably about 600 μm.

13. The multimode quartz glass fiber according to one of the preceding embodiments, where the quantum dots emit a wavelength and central wavelength, respectively, between 560 and 1600 nm, preferably between 560 nm and 750 nm or between 1300 and 1600 nm, particularly preferably of about 630 nm, preferably at 20° C.

14. The multimode quartz glass fiber according to one of the preceding embodiments, with an opaque or translucent outer sheath.

In this case, the outer sheath can be translucent or opaque. If the outer sheath is opaque, the pump wavelength cannot be applied laterally (lateral pump geometry) but must be applied on the front surface. If the outer cladding is opaque, a lateral pump geometry can be used in which the pump wavelength is transmitted through the outer sheathing into the NK cladding and into the fiber core. In this case, the converted light is also emitted to the outside and the fiber can be used as a light source. This property is also present in the longitudinal pump geometry. Thus, the present invention also concerns the use of the longitudinal and transversal embodiment as illumination means.

Embodiment "Nanocomposite as Cladding":

The embodiment "nanocomposite as cladding" refers to a multimode quartz glass fiber according to one of the previous embodiments, whereby the nanocomposite forms the cladding layer (embodiment 15).

In this embodiment, the pump light can be irradiated longitudinally or transversely. Transversal irradiation can mean that the pump light is irradiated at the place of temperature measurement.

16. The multimode quartz glass fiber according to embodiments 15, with the cladding layer of nanocomposite formed over the entire fiber length.

In the "nanocomposite as cladding" version, the nanocomposite (i.e. the concentration of QDs and the layer thickness) is selected so that the desired transverse penetration depth is achieved. For transverse pumping, the cladding layer must be thick enough in order that sufficient QDs are within the irradiated volume to absorb the pumping power. In addition, the layer must only be so thick that the finite transmission (~90%) at the signal wavelength leads to only minimal power loss. For longitudinal pumping, the penetration depth of the evanescent field is in the range <1 µm, i.e. no matter how thick the layer is, the interaction between pump light and QDs is equally guaranteed.

The refractive index is chosen so that the pump light is propagated through the quartz glass fiber. However, if the difference in refractive index between the fiber core of quartz and nanocomposite is very small, the optical conductivity of the quartz glass fiber becomes susceptible to bending. A preferred refractive index in this form is in the range of 1.37-1.45, with a further preferred refractive index difference between the fiber core and the nanocomposite of 0.02-0.07.

When measuring on a fiber line, the wavelength shifted signal (origin local heating at measuring point) is superimposed on the non wavelength-shifted signal (most of the fiber is at ambient temperature and converts accordingly). Basically, the larger the heated area, the more dominant the redshifted emission due to the temperature change, the more clearly the heating can be measured. However, there is a risk that one cannot distinguish between the shifted and the non-shifted signal if the temperature difference is not large enough. There is the possibility of a temporal clocking with an optical pulse (OTDR) to assign a fixed time in the pulse to a fixed location in the fiber. It should so be possible to find out the place of frequency conversion, i.e. the place of temperature increase. For this purpose, a pump pulse is irradiated at a known time and the arrival time of the signal pulse or pulses is recorded. In addition, the measured signal is split up according to wavelength. Thus, it is possible to assign which wavelength components originate from which fiber position.

17. The multimode quartz glass fiber according to one of the preceding embodiments, further comprising a sheath applied directly to the cladding layer.
18. The multimode quartz glass fiber according to one of the preceding embodiments, where the sheathing, which is applied directly to the cladding layer, has a layer thickness of up to 50 µm.

There is no further layer between the fiber core and the cladding layer.

19. The multimode quartz glass fiber according to one of the previous embodiments, where the fiber core does not contain a fluorine trench and/or doping.

There may be special fiber profiles (i.e. radial refractive index distributions) where a fluorine trench is provided in the glass structure and yet the NK is still applied on the outside as an additional cladding. The core can also optionally contain dopants that further increase the refractive index (e.g. germanium).

20. The multimode quartz glass fiber according to one of the previous embodiments, where the cladding layer has a thickness of 1-150 µm, preferably 30-80 µm and most preferably about 50 µm.

In principle, the thickness of the cladding layer is freely selectable, whereby the rule is that (for the same QD density in the nanocomposite) the more QDs are available, the thicker the layer is. These can be excited with correspondingly higher total power at the pump wavelength.

Embodiment "Nanocomposite on Fiber Front Surface":

The embodiment "nanocomposite on fiber front surface" refers to a multimode quartz glass fiber according to one of the previous embodiments, whereby the nanocomposite is formed at the front surface at one end of the quartz glass fiber or at the front surface between two sections of the quartz glass fiber (embodiment 21).

The term "front surface" herein means that the nanocomposite is arranged perpendicular to the fiber core and covers the cross-section of the fiber core at least partially, preferably completely.

In the "nanocomposite on fiber front surface" embodiment, the refractive index of the nanocomposite can be selected so that as little light as possible is emitted laterally, but is as much as possible coupled over into the adjacent, second, quartz glass fiber section. This requires a specific adjustment between the refractive index of the capillary and the refractive index of the polymer.

In these embodiments of the invention, the cladding of the quartz glass fiber can be freely chosen. Preferably, however, the cladding does not contain quantum dots.

In this embodiment, the pump light can be irradiated longitudinally or transversely.

22. The multimode quartz glass fiber according to embodiment 21, whereby the nanocomposite has a layer thickness of 1 µm to 20 mm in the longitudinal direction (at the front surface in the direction of the fiber core).

Herein, "longitudinal direction" refers to the direction of the quartz glass fiber/fiber core, i.e. the direction in which the pump light propagates through the fiber core.

Herein, "transverse direction" means the direction perpendicular to the longitudinal direction. The thickness of the cladding layer on the fiber core is thus measured in the transverse direction.

The layer thickness is determined in all embodiments of the invention depending on the following parameters:

Total power available at the pump wavelength in the fiber core.

Concentration of QDs in the NK.

Transmission of the selected polymer at the pump and signal wavelength

Exact refractive index of the nanocomposite, especially of the fluoropolymer

Sensitivity of the detection device for the signal wavelength.

Refractive index of the medium surrounding the layer thickness (here glass capillary, optionally with lower refractive index than the nanocomposite for total reflection).

The exact determination of the mentioned parameters leads to an optimal coating thickness. This optimum can be adapted to the measuring task depending on the context.

23. The multimode quartz glass fiber according to one of the preceding embodiments, where the nanocomposite is formed at the front surface at one end of a quartz glass fiber or between two quartz glass fiber sections.

In this embodiment, the nanocomposite can interrupt the quartz glass fiber in a longitudinal direction and the following sequence (in the direction of the pumping light) results: quartz glass fiber with fiber core, cladding layer and optionally further coating(s) and an adjacent (and contacting) section of nanocomposite with quantum dots, and again an adjacent quartz glass fiber with fiber core, cladding layer and further coating(s).

In this embodiment it is also possible that the quartz glass fiber sections before and after the nanocomposite differ from each other, for example, have a different fiber core, cladding, diameter or sheathing.

However, it is also possible that the nanocomposite is arranged at the end and no further quartz glass fiber section is attached. The following sequence (in the direction of the pumping light) then results: quartz glass fiber with fiber core, cladding layer and optionally further coating(s) and an adjacent (and contacting) section of nanocomposite with quantum dots.

In the above embodiments, the nanocomposite can be arranged in a shape-providing container, for example a capillary.

24. The multimode quartz glass fiber according to one of the preceding embodiments, whereby the nanocomposite is formed as a front surface of an end of the quartz glass fiber and the nanocomposite, as well as an adjacent region of the multimode quartz glass fiber, is arranged in a capillary, preferably a glass capillary.

When using a glass capillary, the refractive index of the glass capillary (in all embodiments of the invention) can be selected so that total reflection takes place at the interface between NK and capillary.

25. The multimode quartz glass fiber according to one of the preceding embodiments, whereby the nanocomposite is formed as a front surface between two sections of the quartz glass fiber and the nanocomposite, as well as an adjacent region of the multimode quartz glass fiber, is arranged in both directions in a capillary, preferably in a glass capillary.

26. The multimode quartz glass fiber according to one of the preceding embodiments, where the nanocomposite layer is arranged behind a wavelength-selective element perpendicular to the fiber direction.

Depending on the embodiments, a dichroic mirror (2-color mirror, blue is reflected, red is transmitted), a diffraction grating (diffraction of different wavelengths at different angles and thus spatial separation), or a prism (refraction at the interfaces of the prism) can be used.

27. Sensor arrangement, comprising:
    a transmitter unit;
    a receiver unit;
    a connection arrangement containing the multimode quartz glass fiber according to one of embodiments 1-26, which connects the transmitter unit and the receiver unit;
    wherein the transmitter unit is adapted to couple an optical signal into the multimode quartz glass fiber or to radiate it into the cladding, the optical signal being suitable to excite the quantum dots of the multimode quartz glass fiber depending on the temperature at the measuring point(s), and the receiver unit is adapted to receive a temperature-dependent optical signal thus generated, the temperature at the measuring point(s) being derivable from the temperature-dependent optical signal.

Since the detection occurs exclusively at the signal wavelength, the measuring method is largely insensitive to ambient light. The temperature-dependent optical signal can also be a superposition of the light emitted by the quantum dots and the irradiated optical signal.

28. Sensor arrangement according to embodiment 27, where the temperature-dependent optical signal is a light emitted by the quantum dots if the nanocomposite is formed as a layer perpendicular to the fiber direction, or the temperature-dependent optical signal is a superposition of the light emitted by the quantum dots and the optical signal if the nanocomposite is formed as a cladding layer on the fiber core.

In embodiments in which the nanocomposite is formed as a cladding layer on the fiber core, it is preferred to assign a timing of the optical signal of the transmitting unit by means of an optical pulse (OTDR) around a fixed location in the fiber to a fixed time in the pulse. Thus it should be possible to find out the location of the frequency conversion into the corresponding shifted wavelength range, i.e. the location of the temperature increase. Especially since the propagation times at the pump wavelength, at the signal wavelength at e.g. temperature 1 and at the signal wavelength at e.g. temperature 2 are known and are measured at the detector.

According to the invention, a good interaction between the pump light ("optical signal" or "optical signal of the transmitter unit") and the quantum dots is required, i.e. it is necessary that the pump light can be absorbed by the quantum dots. At transveral interaction between the pump light and the quantum dots (i.e. the nanocomposite is in cladding), the interaction can be scaled over the fiber length. In the case of longitudinal interaction between the pump light and the quantum dots (i.e. the nanocomposite is located at one fron surface of a quartz fiber or between two front faces of two quartz fibers), the interaction can be adjusted via the layer thickness of the nanocomposite.

29. Sensor arrangement according to one of the embodiments 27 to 28, the sensor arrangement having a computing unit connected to the receiver unit, which is configured to determine a temperature at the measuring point or points from the temperature-dependent optical signal.

30. Sensor arrangement according to one of the embodiments 27 to 29, the sensor arrangement having a multimode quartz glass fiber branch which leads to a temperature measuring point, the temperature measuring point being formed with the nanocomposite layer in the quartz glass fiber, perpendicular to the fiber direction.

31. Sensor arrangement according to embodiment 30, wherein the branch contains a coupler, the coupler being configured in such a way that the temperature-dependent light signal, which propagates from the measuring point towards the branch, is conducted to the receiver unit.

32. Sensor arrangement according to one of the embodiments 27 to 31, wherein the receiver unit is configured to detect a wavelength between 560 and 1600 nm, preferably 560 and 750 nm or 1300-1600 nm (e.g. for InP/ZnS quantum dots or InAs/InP quantum dots), preferably of 630 nm.

33. A method of measuring temperature at one or more measuring point(s) by means of the sensor arrangement according to one of the embodiments 27-32, the method comprising the following steps:
    emitting an optical signal by means of the transmitter unit, whereby the optical signal hits the quantum dots in the nanocomposite;
    coupling the light emitted by the quantum dots, which represents the temperature-dependent optical signal, or the light generated by superposition of the temperature-dependent optical signal with the optical signal, into the interconnect device;

conducting the temperature-dependent optical signal coupled into the interconnect assembly to the receiver unit; and receiving the temperature-dependent optical signal by means of the receiver unit in such a way that information about the temperature at one or more measuring point(s) can be derived from the temperature-dependent optical signal by the receiver unit.

34. Use of a multimode quartz glass fiber according to one of embodiments 1-26 for temperature measurement.

The multimode quartz glass fibers, which are in accordance with the invention, can be used for various applications. For example, for temperature measurements or as illumination or both in combination.

With the embodiment "nanocomposite as cladding", light emission can be achieved over the entire cladding. However, it is also possible to make the quantum dots glow locally by transversely pumping into the fiber, for example to measure the temperature at this location.

In the embodiment "nanocomposite at front surface", the temperature is measured locally on the nanocomposite. The refractive index can be optimized for the respective application. Examples for the concrete use of the fibers for temperature measurement are described in examples 1 and 2.

In this embodiment, the fiber cladding itself is functionalized, i.e. the nanocomposite is applied as cladding. Here, the nanocomposite represents an interface to the optical fiber core. The task of the nanocomposite (e.g. the lacquer PC-404 of the manufacturer Luvantix can be used) is to ensure the optical guidance in the fiber core by completely enclosing the fiber core or at least partially covering the surface of the fiber core and having a significantly lower refractive index (difference of 0.02 or more).

By introducing the QDs into the nanocomposite, the functions of the polymer matrix (lacquer) and QDs can be combined. Accordingly, a fiber cladding is created, which converts irradiated photons at one wavelength (pump wavelength) via radiative recombination of eletron-hole pairs to photons with a longer wavelength (signal wavelength).

35. Method for producing a multimode quartz glass fiber, preferably according to one of the embodiments 1-26, comprising the steps I) Providing a fiber core, II) Applying an uncured viscous nanocomposite containing one or more UV-curable polymers and quantum dots as a coating on the fiber core, wherein the surface of the fiber core has a defined temperature, preferably from 10 to 80° C., at the time of application and/or the viscosity is preferably in the range of 1-7 kg/(m·s) (1000-7000 cPs) at 25° C., III) Curing the viscous nanocomposite by means of UV light with a wavelength of 200 nm-450 nm, preferably with an irradiance of about 2 W/cm$^2$, and IV) Obtaining the multimode quartz glass fiber, or the quartz glass fiber with NK cladding.

Clumping (agglomeration) of the quantum dots leads to a deterioration of the mechanical properties of the quartz glass fiber, in particular it becomes brittle. Before the polymer matrix is cured, phase separation between polymer and quantum dots must be avoided. A homogeneous polymer mixture can be achieved by the inventive process described here.

Unwanted aggregates can be detected by optical inspection. In order for the material to be particularly suitable, it should have the highest possible optical transparency, as few lumps as possible and as few streaks as possible before being applied to the fiber core. Techniques such as tempering, filtering, stirring and decanting can be used to maintain homogeneity.

The wavelength and dose of UV radiation is important to achieve complete curing. Therefore, the tensile speed of the core fiber to be coated must be matched to the UV intensity. The irradiance (W/cm$^2$) and the tensile speed (exposure time of the UV radiation per fiber position in seconds) result in a fluence (J/cm$^2$). Thus, the parameters i) pulling the fiber core out of the preform melt, ii) coating the fiber core with nanocomposite and iii) UV curing of the nanocomposite must be coordinated.

UV curing of the nanocomposite is preferably achieved by applying UV radiation from outside. A special combination of lamps with wavelengths adapted to the absorption of the nanocomposite or the photoinitiators contained in the polymer matrix is used for this purpose.

36. The process according to embodiment 35, wherein step I) comprises drawing the fiber core from a fiber preform and/or the uncured liquid nanocomposite in step II) is applied by vertical gravity or also pressure coating at a speed sufficiently slow to avoid air inclusions between the fiber core and the coating.

When the nanocomposite is applied to the fiber core, the uncured nanocomposite must be at the correct temperature. In the case of pressure coating, the viscous coating must be applied to the fiber at the correct pressure (using argon gas). The curing of the coating takes place directly after the application even before other materials are applied. A multi-layer process is possible in which the NK represents an inner layer and another layer is applied with or without function. The stationary flow condition of the NK in the coating nozzle, which is formed during the coating process, influences whether or not undesired air inclusions occur.

Air inclusions between the fiber core and the coating must be avoided to ensure sufficient mechanical stability.

The fiber preform can be manufactured by known processes, for example by modified chemical vapor deposition (MCVD) or by means of PCVD (plasma activated chemical vapor deposition) in a quartz glass substrate tube. A typical manufacturing process of a modern bending insensitive fiber includes, for example, MCVD deposition in an F-300 substrate tube (see https://www.heraeus.com/media/media/hqs/doc_hqs/products_and_solutions_8/optical_fiber/Fiber_Tubes_EN_2018_04.pdf) and collapsing the internally coated tube into a solid rod. The F-300 tube material typically has a Cl content of 800 to 2000 ppm and/or an OH content of 0.2 ppm.

Processes for the production of preforms are known to the expert. Such procedures are described in the following documents, for example: DE69922728 T2, U.S. Pat. Nos. 4,276,243A, 4,412,853, and 4,582,480.

Thus the fiber is preferably made of quartz glass with an OH concentration of ≤0.2 ppm, a chlorine content of 800-2000 ppm and/or a refractive index of +0.35 to +0.5×10$^{-3}$. Besides synthetic quartz glass, natural quartz glass known to experts can also be used. This contains contaminations, which do not, however, significantly impair the basic function of the quartz glass core.

37. The process according to embodiment 35 or 36, whereby the fiber core is heated in a preheating oven to the desired surface temperature before the uncured liquid nanocomposite is applied.

The surface of the fiber core must not be too hot or too cold at the time of application of the uncured liquid polymer matrix, otherwise the polymer matrix will not adhere sufficiently firmly.

The nanocomposite-coated fiber surface must be kept dust-free prior to any extrusion process which might be used to apply a sheath.

Possible impurities or unevenness from the fiber draw during the production of the fiber core and the nanocomposite can have a negative effect on the surface quality of the extruded layer or even on the mechanical reliability of the layer and thus of the entire multimode quartz glass fiber.

38. The process according to one of embodiments 35-37, where the material of the sheath to be extruded is melted before being applied to the cured nanocomposite.

In addition to the cladding, the multimode quartz glass fiber can have other sheaths, such as hermetic coatings such as carbon or metallic coating layers such as, for example, aluminum. It is preferable that there is no other cladding apart from the cladding.

When using a two-layer acrylate, a low-index acrylate can be used for the inner layer. Thus a waveguide for the pump wavelength and for the resulting signal wavelength can be guaranteed over many meters (~1 km). At the same time there is a tradeoff, because even if the pump wavelength shall be well guided to achieve a scaling of the absorption over the length, the evanescent field should at the same time also penetrate far enough into the nanocomposite to allow an efficient conversion. Therefore, the refractive index of the coating material must be smaller than that of the fiber core.

As already described, clumping (agglomeration) of the quantum dots must be prevented. This can be achieved by surface modification of the QDs, by selecting a suitable (organic) ligand with the aim of an optimized dispersion, for example using tri-n-octylphosphine oxide (TOPO), or by changing a ligand after the preparation of the QDs to adapt to the matrix (the polymer) (see J. Wang et al. "Semiconductor Quantum Dots Surface Modification for Potential Cancer Diagnostics and Therapeutic Applications", Hindawi Journal of Nanomaterials, Volume 2012; G. R. Bardajee et al. "Surface passivation of CdSe-TOPO quantum dots by poly(acrylic acid): Solvent sensitivity and photo-induced emission in water" Iran Polym J, 2013).

Leaving it standing for too long after mixing and before applying the nanocomposite to the fiber core can lead to phase separation and should be avoided.

39. Multimode quartz glass fiber obtained or obtainable by the process according to one of embodiment 35-38.

The molten material is applied to the fiber at a specified melt pressure, whereby only pressure fluctuations in a range of 0-20%, preferably 0-10%, should occur.

The present disclosure will be further explained with reference to the figures:

FIGURES

FIG. 1: Lateral emitted optical spectrum at a coupling of pump light at a wavelength of 450 nm and an average power of about 3 mW into the quartz glass fiber according to example 1. From the figure it can be seen that the emitted signal has a central wavelength of 626 nm and a half-width (HWB) of 31 nm. It is also conceivable that the pump light is applied laterally to the fiber (transverse pumping). In this case, the emitted optical spectrum does not differ between longitudinal and transverse pumping.

Figure 2:
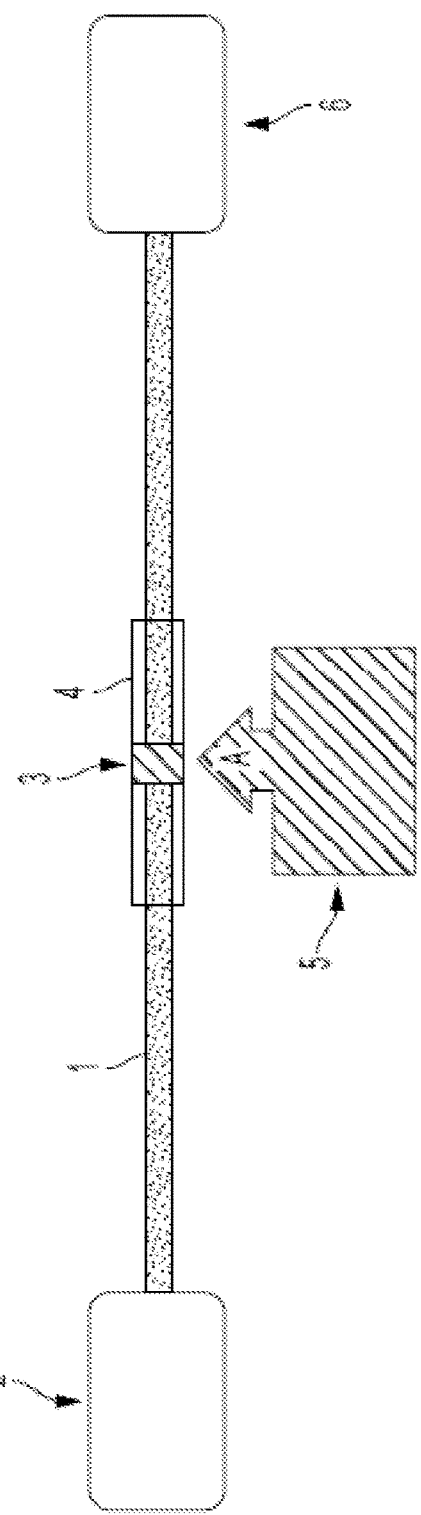

FIG. 2: Arrangement for stationary optical temperature measurement in transmission between two fiber front surfaces. Reference signs: 1=quartz glass fiber; 2=light source; 3=nanocomposite; 4=capillary; 5=temperature measuring point; 6=evaluator.

Figure 3:
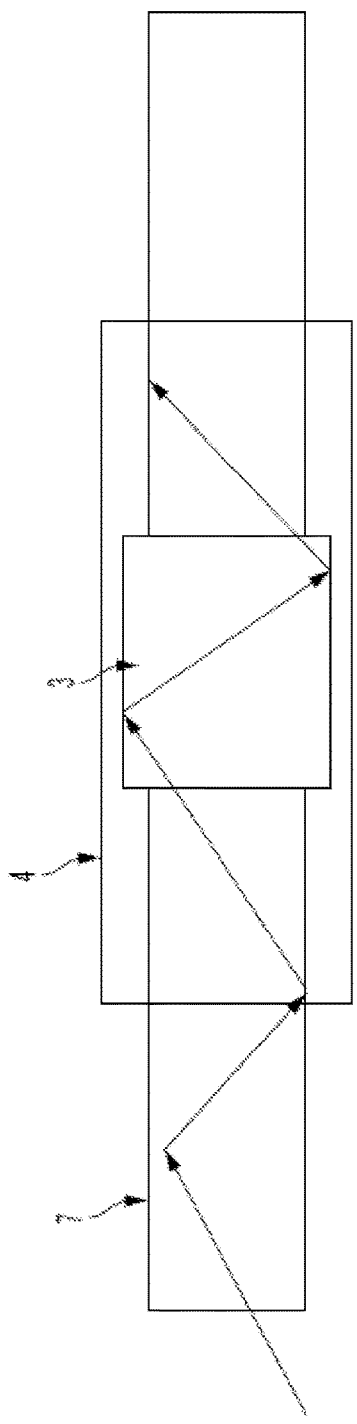

FIG. 3: The figure shows the longitudinal embodiment in which the nanocomposite is placed between two quartz glass fiber sections. The nanocomposite and a part of the adjacent quartz glass fiber sections are arranged in a capillary. Total reflection at the capillary is possible if n capillary<n glass-n glass (where n is the refractive index). Reference signs: 7=glass with refractive index n; 3=nanocomposite with refractive index n; 4=capillary.

Figure 4:
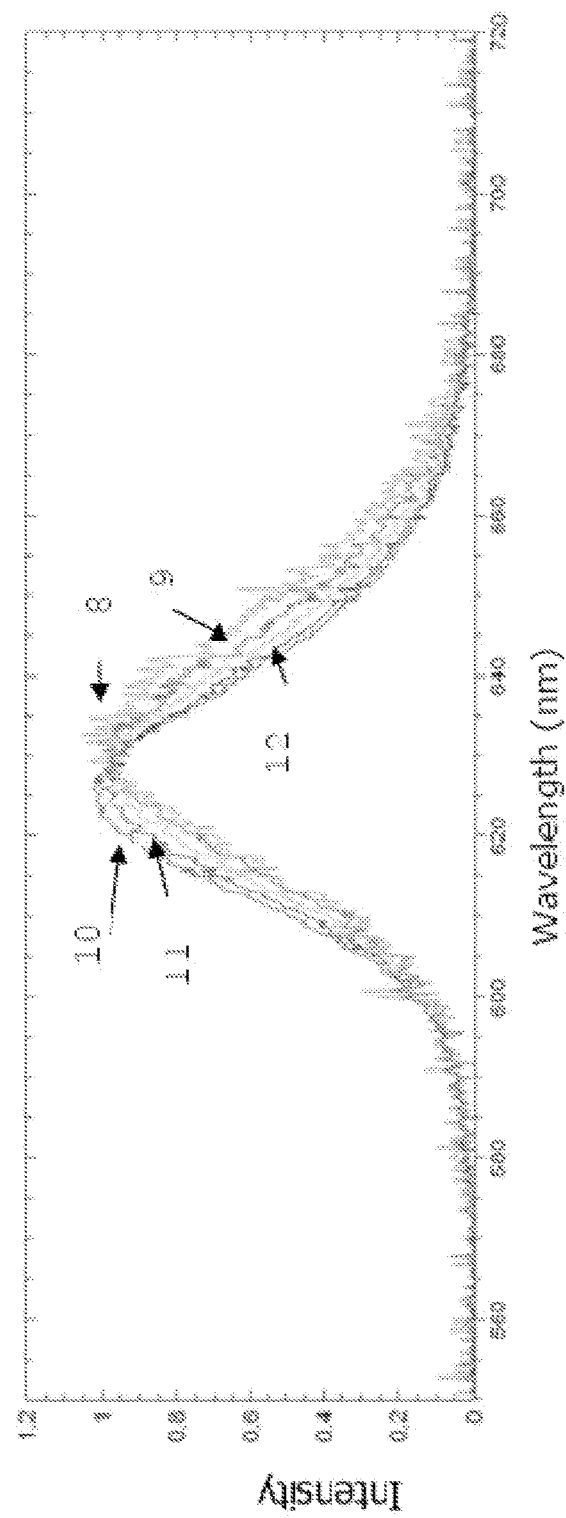

FIG. 4: Emitted signal spectrum as a function of the set temperature of the heating plate. Reference signs: 8=125 degrees heating plate, 5 min; 9=100 degrees heating plate, 5 min; 10=24 degrees room temperature, 5 min; 11=50 degrees room temperature, 5 min, 12=75 degrees heating plate, 5 min.

Figure 5:
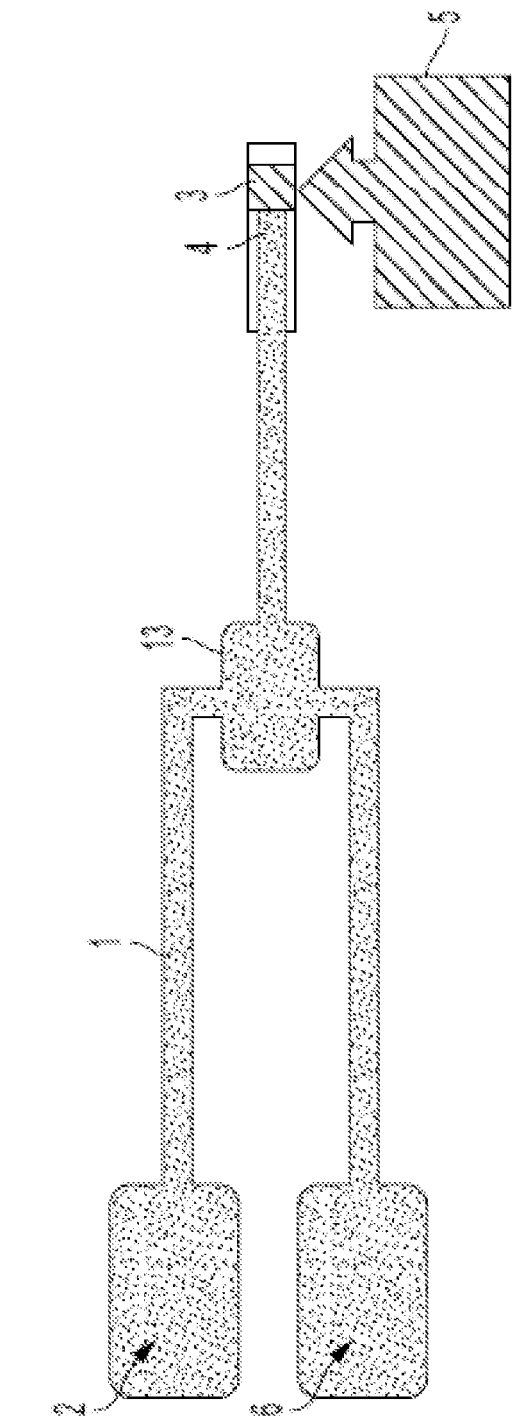

FIG. 5: Arrangement for stationary optical temperature measurement in reflection between two fiber front surfaces. Reference signs: 1=quartz glass fiber with or without nanocomposite in the cladding; 2=light source; 3=nanocomposite; 4=capillary; 5=temperature measurement point; 6=evaluator; 13=3 dB coupler.

Figure 6:
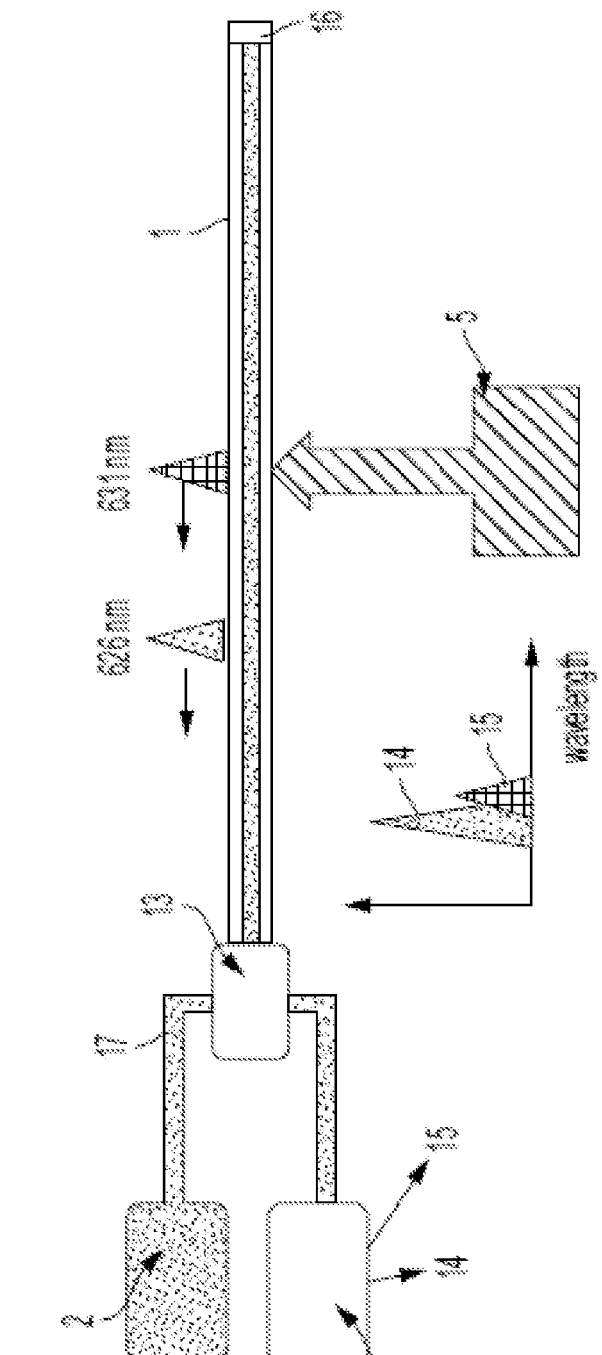

FIG. 6: Arrangement for location-independent optical temperature measurement in reflection with nanocomposite in cladding. Reference signs: 1=quartz glass fiber with nanocomposite in the cladding; 2=light source; 3=nanocomposite; 4=capillary; 5=temperature measurement point (125° C.); 6=evaluator; 13=3 dB coupler, 14=channel 1, 626 nm, 15=channel 2, 631 nm, 16=reflecting end, 17=light waveguide with or without nanocomposite in cladding.

Figure 7:
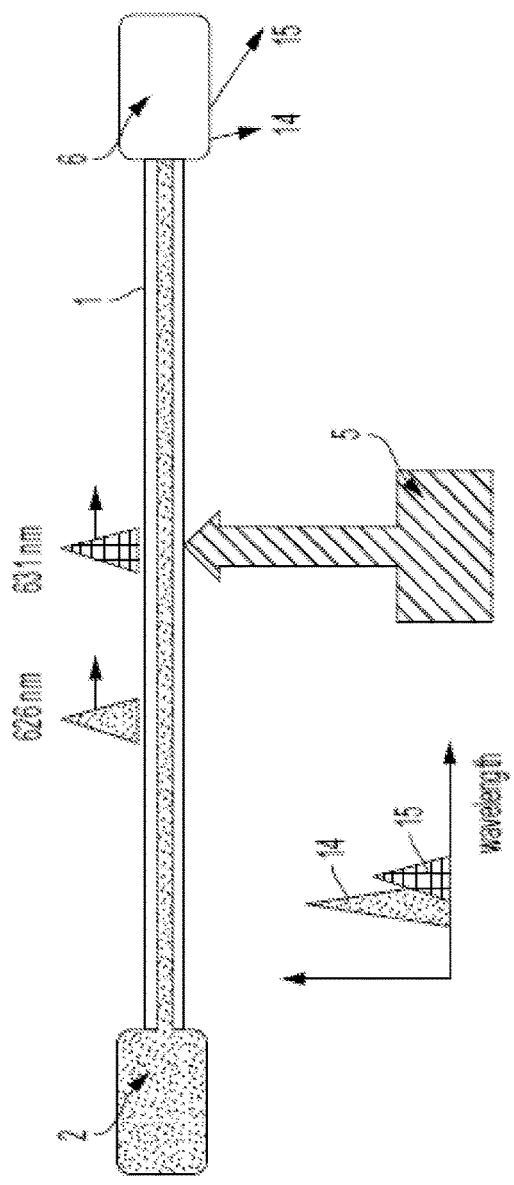

FIG. 7: Arrangement for the location-independent optical temperature measurement in transmission with nanocomposite in the cladding. Reference signs: 1=quartz glass fiber with nanocomposite in the cladding; 2=light source; 5=temperature measuring point (125° C.); 6=evaluator; 14=channel 1, 626 nm, 15=channel 2, 631 nm.

Figure 8:
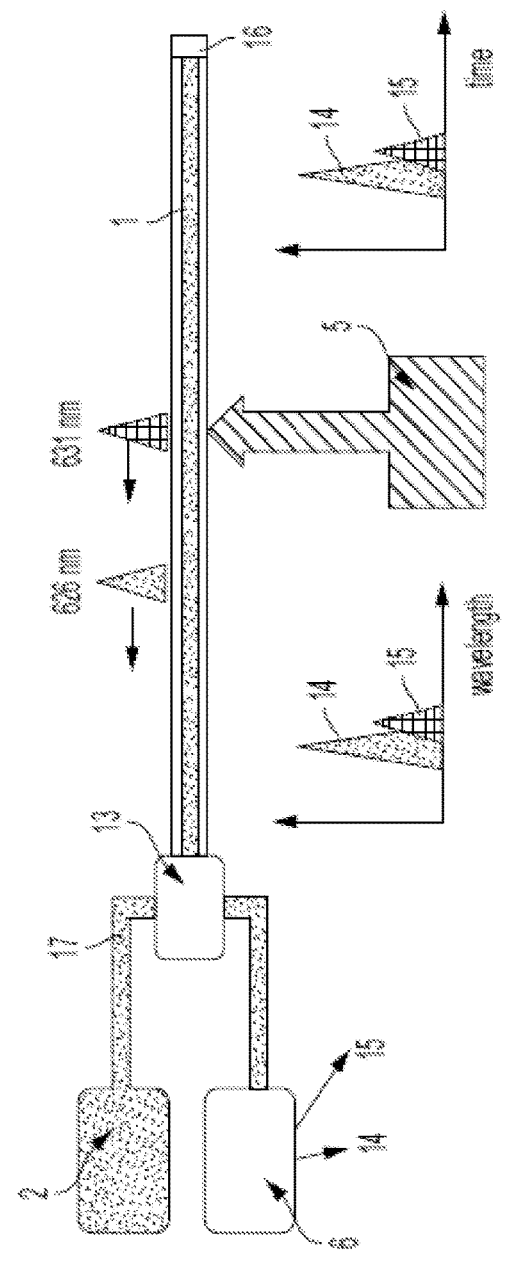

FIG. 8: Arrangement for location-dependent optical temperature measurement in reflection with nanocomposite in the cladding. Reference signs: 1=quartz glass fiber with nanocomposite in the cladding; 2=light source; 5=temperature measurement point (125° C.); 6=evaluator; 13=3 dB coupler, 14=channel 1, 626 nm, 15=channel 2, 631 nm, 16=reflecting end, 17=optical fiber with or without nanocomposite in cladding.

Figure 9:
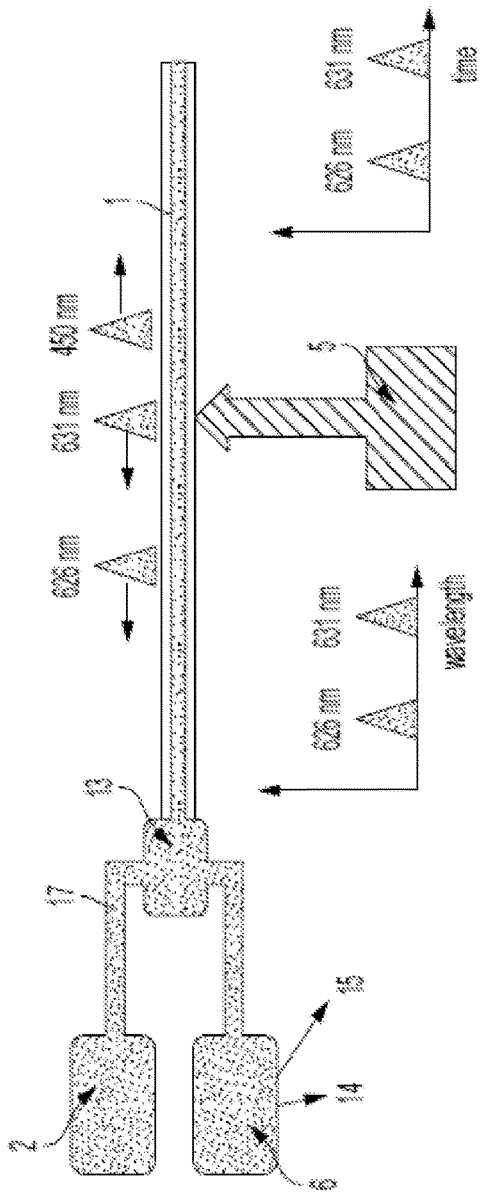

FIG. 9: Arrangement for location-dependent optical temperature measurement in reflection with nanocomposite in the cladding. Reference signs: 1=quartz glass fiber with nanocomposite in cladding; 2=light source; 5=temperature measuring point (125° C.); 6=evaluator; 13=3 dB coupler, 14=channel 1, 626 nm, 15=channel 2, 631 nm, 17=light waveguide with or without nanocomposite in cladding.

Figure 10:
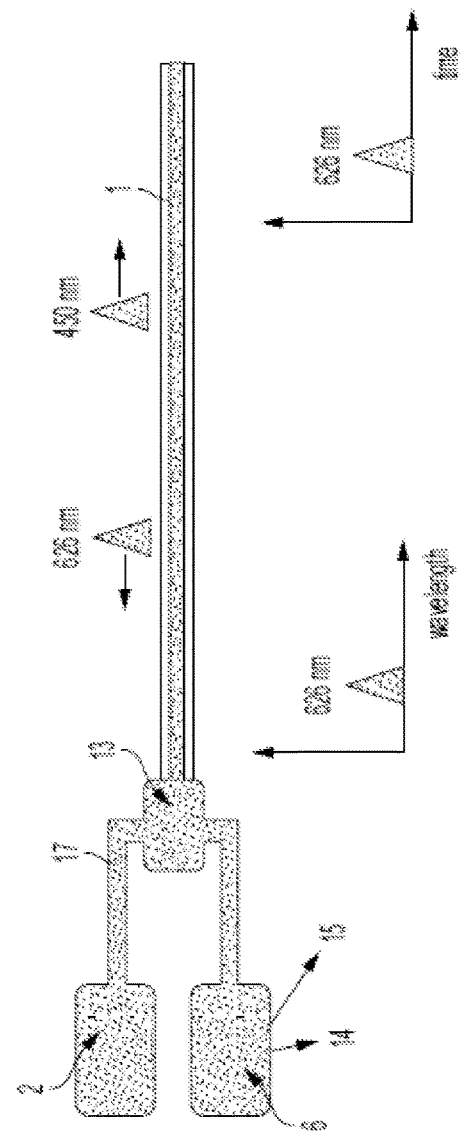

FIG. 10: Arrangement for location-dependent optical temperature measurement in reflection with nanocomposite in the cladding. Reference signs: 1=quartz glass fiber with nanocomposite in the cladding; 2=light source; 5=temperature measuring point (125° C.); 6=evaluator; 13=3 dB coupler, 14=channel 1, 626 nm, 15=channel 2, 631 nm, 17=light waveguide with or without nanocomposite in cladding.

Figure 11:
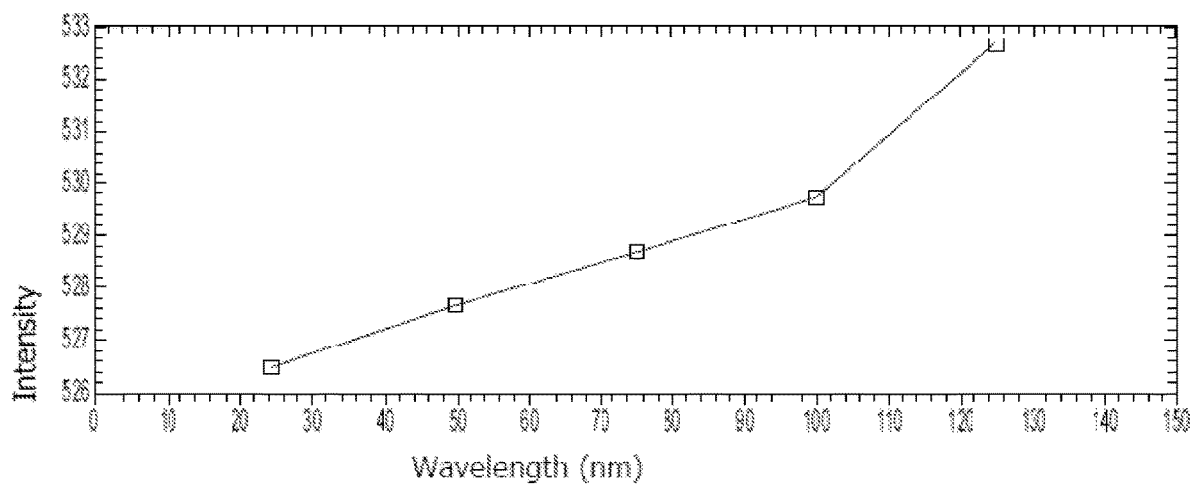

FIG. 11: Temperature dependence of the emitted central wavelength on the set temperature at the heating plate, as measured for example in an arrangement as shown in FIG. 2.

Figure 12:
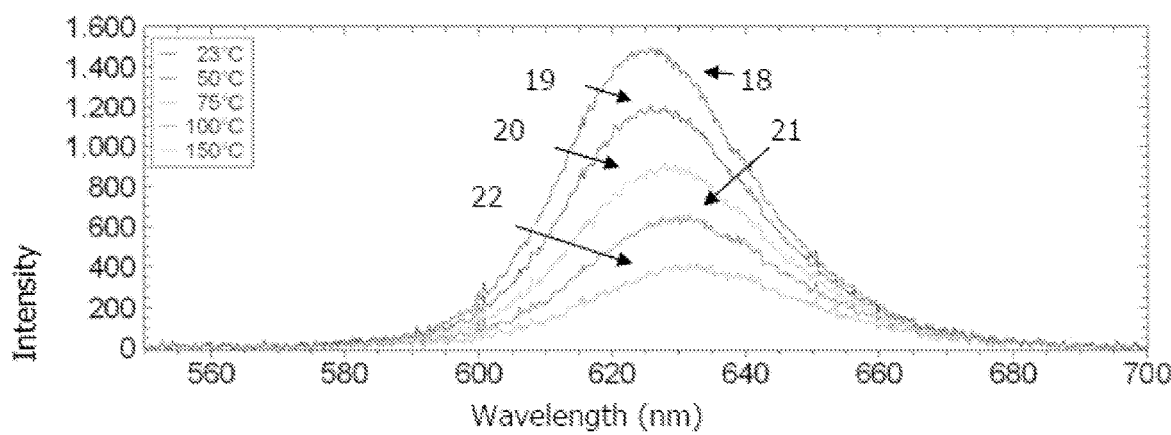

FIG. 12: Relative intensity as a function of temperature, as measured for examples in an arrangement as shown in FIG. 2. Reference signs: 18=23° C.; 19=50° C.; 20=75° C.; 21=100° C., 22=150° C.

Figure 13:
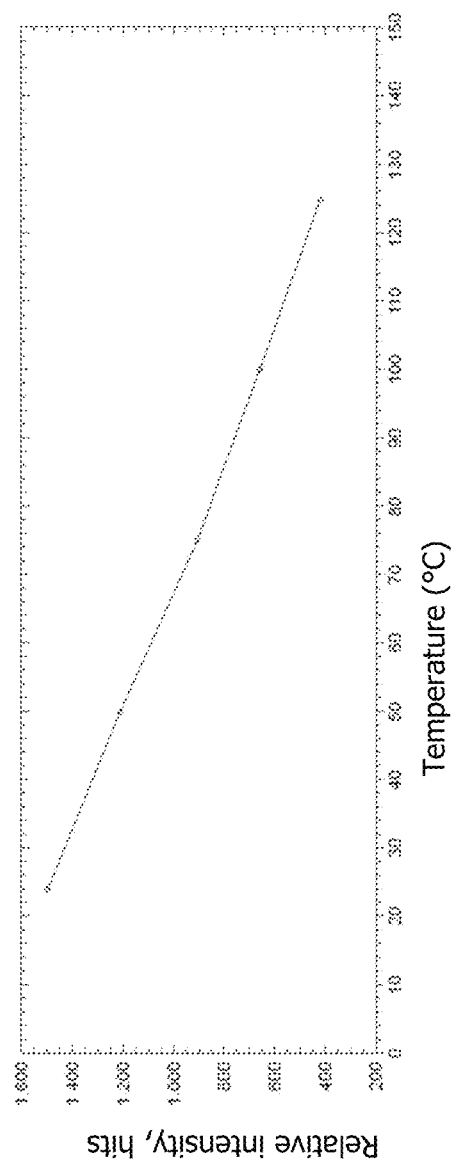

FIG. 13: Peak values of the emitted spectra plotted as a function of temperature, as measured for example in an arrangement as shown in FIG. 2.

In the embodiment "nanocomposite in cladding", the arrangement of the pump light source (transmitter unit) and the measuring unit (receiver unit) can be as shown in FIGS. 6-10, for example.

In the embodiment "nanocomposite on fiber front surface", the arrangement of the pump light source (transmitter unit) and the measuring unit (receiver unit) can be as shown in FIG. 2 or 5, for example.

The reflection of the pump light at the optionally used capillary can be used to re-couple the light emitted by the quantum dots into the fiber. In the case of FIG. 2, the coupled light is measured, which propagates further in the direction of the original light. In the case of FIG. 5, the coupled light is measured, which can be propagated in the opposite direction to the original light and guided to a receiver unit.

The invention particularly refers to the following embodiments:
1. Multimode quartz glass fiber, comprising:
a) a fiber core of quartz glass,
b) a cladding layer, and
c) a nanocomposite material containing one or more UV-cured polymers and one or more types of quantum dots capable of emitting one or more central wavelengths;
and wherein the nanocomposite either
i) forms the cladding layer, wherein the cladding layer is applied directly onto the fiber core, wherein the nanocomposite has a lower refractive index at the central wavelength of the quantum dots or one of the central wavelengths than the quartz glass of the fiber core, at that central wavelength; or
ii) is formed as a front surface of an end of the quartz glass fiber or as a front surface between two sections of the quartz glass fiber.
2. Multimode quartz glass fiber according to item 1, wherein the nanocomposite comprises
polymers in an amount of 80-99.5 weight percent based on the total weight of the nanocomposite,
quantum dots in an amount of 0.5-15 weight percent, based on the total weight of the nanocomposite,
optional additives in an amount of 0-10 weight percent based on the total weight of the nanocomposite.
3. Multimode quartz glass fiber of item 1 or 2, wherein the polymer(s) are selected from the group consisting of fluoroacrylate-based polymers, urethane-acrylate-based polymers, fluorosiloxanes, epoxy-acrylate-based polymers, polyester-acrylate-based polymers, urethane-acrylate-based polymers, silicone-acrylate-based polymers, acrylic-acrylate-based polymers, polydimethylsiloxane, polyimide, fluorinated urethanes, and copolymers and mixtures thereof
4. Multimode quartz glass fiber according to any preceding item, where the quantum dots contain combinations of group II-VI elements, III-V elements, and/or IV-VI elements of the periodic table
5. Multimode quartz glass fiber according to any preceding item, further comprising a sheath applied directly to the cladding layer.
6. Multimode quartz glass fiber according to any preceding item, whereby the nanocomposite is formed as a front surface on one end of the quartz glass fiber and the nanocomposite, as well as an adjacent area of the multimode quartz glass fiber is arranged in a capillary.
7. Multimode quartz glass fiber according to any preceding item, whereby the nanocomposite is formed as a front face between two sections of the quartz glass fiber and the nanocomposite, as well as an adjacent area of the multimode quartz glass fiber is arranged in a capillary in both directions.
8. Sensor arrangement, comprising:
a transmitter unit;
a receiver unit;
a connection arrangement containing the multimode quartz glass fiber according to any of items 1-7, connecting the transmitter unit and the receiver unit;
wherein the transmitter unit is adapted to couple an optical signal into the multimode quartz glass fiber or to radiate it into the cladding, the optical signal being suitable for exciting the quantum dots of the multimode quartz glass fiber in dependence on the temperature at the measuring point(s), and the receiver unit is adapted to receive a temperature-dependent optical signal thus generated, wherein the temperature at the measuring point(s) is derivable from the temperature-dependent optical signal.
9. A method of measuring temperature at one or more measuring point(s) by means of the sensor arrangement according to item 8, wherein the method comprising the following steps:
Emitting an optical signal by means of the emitter unit, whereby the optical signal impinges on the quantum dots in the nanocomposite;
coupling of the light emitted by the quantum dots, which represents the temperature-dependent optical signal, or which generates the temperature-dependent optical signal by superposition with the optical signal, into the interconnect device;
conducting the temperature-dependent optical signal coupled into the interconnect assembly to the receiver unit; and
receiving the temperature-dependent optical signal by means of the receiver unit in such a way that information about the temperature at one or more measuring point(s) can be derived from the temperature-dependent optical signal by the receiver unit.
10. Method of using a multimode quartz glass fiber according to any of items 1-7 for temperature measurement.
11. Method for producing a multimode quartz glass fiber, preferably according to any of items 1-7, comprising the steps
I) Providing a fiber core,
II) Applying an uncured viscous nanocomposite containing one or more UV-curable polymers and quantum dots as a coating on the fiber core,
III) Curing the viscous nanocomposite by means of UV light, and
IV) Obtaining the multimode quartz fiber.
12. Multimode quartz glass fiber obtainable or obtained by the process according to item 11.

EXAMPLES

Example 1—Local Temperature Measurement with Nanocomposite in Fiber Cladding

The UV-curing varnish PC-404 from the manufacturer Luvantix was used as an optical sheath for optical fibers.

As QDs Core-Shell QDs from CdSe/CdS were used. The proportion of QDs in the lacquer was 2.4 percent by weight. Analogous to the functional principle of an ambient fiber, the present fiber radiates the signal wavelength laterally when the pump wavelength is coupled into the core (see FIG. 11).

Since there is a linear effect, the conversion efficiency is determined by the nature of the core-shell QDs and has a fixed value for given environmental parameters. The laterally emitted optical spectrum with frontal coupling of the pump wavelength (longitudinal pumping) is shown in FIG. 2. Since the signal wavelength is emitted in all spatial directions, a part of it is also guided in the optical core of the fiber. Without a temporal clocking of the pump wavelength and the measurement, the statement can be made here that "there is a temperature increase of x ° C. at the fiber piece with the length x".

It is shown that a prominent emission requires deep penetration/passing through of the fiber cladding by the pumping light.

Example 2—Local Temperature Measurement with Nanocomposite Between Two Fiber Front Surfaces for Measurement in Transmission The nanocomposite consists of UV-curing lacquer (in this case Luvantix PC-373) and QDs (in this case CdSe/CdS core-shell with 2.4 weight percent). It is placed between two fiber front surfaces and cured. In this case, a temperature measurement can be made using the arrangement shown in FIG. 4. The QD NK is excited by a light source (low-cost laser diode with a wavelength of 400-450 nm and USB connection). The light source provides the pumping light (LED, laser diode), the fiber optic cable leads the pumping light to the place where the temperature measurement is to take place, the lacquer with QDs is located at the fiber front surface and was cured before. A second fiber leads the signal light to the evaluator. Accordingly, the measurement is performed in transmission. To protect the connection between the two fibers and the QD-mixed resist, a quartz glass capillary is located above the connection. The signal is generated in this configuration at the junction and propagates in the fiber, which leads to the evaluator. The evaluator is, for example, a spectrometer which spectrally splits the signal into channels with a certain discretization and displays the average power as a function of wavelength. An edge filter can also be used, which has a defined course. According to the transmitted power behind the edge filter a central wavelength and thus a temperature can be deduced. The setup shown in FIG. 2 was realized experimentally. The dependence of the emitted central wavelength on the temperature was determined experimentally by means of a heating plate.

The result is shown in FIG. 4. FIG. 4 clearly shows that the present nanocomposite consisting of PC-404 and CdSe/CdS core-shell QDs exhibits temperature-dependent emission. It is clearly observable that the central wavelength shifts from smaller to larger values with increasing temperature. The curves are normalized to an intensity of 1. From the increase of the signal to noise ratio it becomes clear that as already reported in (Bueno et al., "Temperature Sensor Based on colloidal Quantum Dots-PMMA Nanocomposite Waveguides" IEEE SENSORS JOURNAL, October 2012, Volume 12, No. 10, pages 3069-3074) a decrease of the signal level is observable.

To show the dependence of the central wavelength on the temperature, FIG. 4 was evaluated and the central wavelengths at the respective temperatures as set were extracted.

The result of the evaluation is shown in FIG. 6. It can be seen that a change of the central wavelength from 626.4 nm to 632.6 nm can be observed at a temperature change from 25° C. to 125° C.

Thus it is proven that the arrangement in FIG. 2 can be used as a measuring system for temperature sensors, provided that the central wavelength of the emission can be determined.

FIG. 4 shows that the signal to noise ratio decreases with increasing temperature. This correlation was also observed by Bueno et al. (Bueno et al., "Temperature Sensor Based on colloidal Quantum Dots-PMMA Nanocomposite Waveguides" IEEE SENSORS JOURNAL, October 2012, Volume 12, No. 10, pages 3069-3074). FIG. 7 shows the emitted spectra without normalization. It can be seen that the relative intensity decreases with increasing temperature.

The connection was shown differently in FIG. 8. For this, the peak values of the relative intensity were plotted over the temperature of the heating plate. It is recognizable that in first approximation there is a linear relationship between the temperature and the intensity.

Thus, it has been proven that the arrangement in FIG. 4 can be used as a measuring system for temperature sensors, provided that the intensity of the emission can be measured. Thus, there are two possibilities to measure a temperature measurement with the proposed arrangement: the determination of the central wavelength or the determination of the emitted absolute power. The temperature range is limited only by the acrylate and could be extended by combination with other high temperature suitable materials (high temperature acrylate, polyimides, etc.).

Example 3—Local Temperature Measurement with Nanocomposite on a Fiber Front Surface for Measurement in Reflection Another possible setup of the measuring system is shown in FIG. 9. In this setup, the signal light is captured which is emitted in the backwards direction by the QD-containing lacquer. The signal propagates backwards through the fiber and reaches the evaluator via the 3 dB coupler. The effect of the temperature on the central wavelength will be the same as already measured in FIG. 6. The geometry of the measuring arrangement is particularly suitable for probes.

The invention claimed is:

1. A method of measuring temperature at one or more measuring point(s) by means of a sensor arrangement comprising:
   a transmitter unit;
   a receiver unit;
   a connection arrangement containing a multimode quartz glass fiber, connecting the transmitter unit and the receiver unit;
wherein the transmitter unit is adapted to couple an optical signal into the multimode quartz glass fiber or to radiate it into a cladding layer, the optical signal being suitable for exciting quantum dots of the multimode quartz glass fiber in dependence on the temperature at the measuring point(s), and the receiver unit is adapted to receive a temperature-dependent optical signal thus generated, wherein the temperature at the measuring point(s) is derivable from the temperature-dependent optical signal;
the method comprising the following steps:
   emitting an optical signal by means of the transmitter unit, whereby the optical signal impinges on the quantum dots in a nanocomposite;

coupling of the light emitted by the quantum dots, which represents the temperature-dependent optical signal, or which generates the temperature-dependent optical signal by superposition with the optical signal, into the connection arrangement;

conducting the temperature-dependent optical signal coupled into the connection arrangement to the receiver unit; and receiving the temperature-dependent optical signal by means of the receiver unit in such a way that information about the temperature at one or more measuring point(s) can be derived from the temperature-dependent optical signal by the receiver unit;

and wherein the multimode quartz glass fiber comprises:
a) a fiber core of quartz glass,
b) the cladding layer, and
c) the nanocomposite, wherein the nanocomposite contains one or more UV-cured polymers and one or more types of quantum dots capable of emitting one or more central wavelengths;

and wherein the nanocomposite either
i) forms the cladding layer, wherein the cladding layer is applied directly onto the fiber core, wherein the nanocomposite has a lower refractive index at the central wavelength of the quantum dots or one of the central wavelengths than the quartz glass of the fiber core, at that central wavelength; or
ii) is formed as a front surface of an end of the quartz glass fiber or as a front surface between two sections of the quartz glass fiber.

2. The method of measuring temperature according to claim 1, wherein the nanocomposite comprises:
polymers in an amount of 80-99.5 weight percent based on the total weight of the nanocomposite,
quantum dots in an amount of 0.5-15 weight percent, based on the total weight of the nanocomposite,
optional additives in an amount of 0-10 weight percent based on the total weight of the nanocomposite, and wherein
the quantum dots contain combinations of group II-VI elements, III-V elements, and/or IV-VI elements of the periodic table.

3. The method of measuring temperature according to claim 2, wherein the polymer(s) are selected from the group consisting of fluoroacrylate-based polymers, urethane-acrylate-based polymers, fluorosiloxanes, epoxy-acrylate-based polymers, polyester-acrylate-based polymers, urethane-acrylate-based polymers, silicone-acrylate-based polymers, acrylic-acrylate-based polymers, polydimethylsiloxane, polyimide, fluorinated urethanes, and copolymers and mixtures thereof; and wherein the quantum dots contain combinations of group II-VI elements, III-V elements, and/or IV-VI elements of the periodic table.

4. The method of claim 1, further comprising a sheath applied directly to the cladding layer.

5. The method of claim 1, wherein the nanocomposite is formed as a front surface on one end of the quartz glass fiber and the nanocomposite, as well as an adjacent area of the multimode quartz glass fiber is arranged in a capillary.

6. The method of claim 1, wherein the nanocomposite is formed as a front face between two sections of the quartz glass fiber and the nanocomposite, as well as an adjacent area of the multimode quartz glass fiber is arranged in a capillary in both directions.

7. A sensor arrangement adapted for measuring temperature at one or more measuring point(s), comprising:
a transmitter unit;
a receiver unit;
a connection arrangement containing a multimode quartz glass fiber, connecting the transmitter unit and the receiver unit;

wherein the transmitter unit is adapted to couple an optical signal into the multimode quartz glass fiber or to radiate it into a cladding layer, the optical signal being suitable for exciting quantum dots of the multimode quartz glass fiber in dependence on the temperature at the measuring point(s), and the receiver unit is adapted to receive a temperature-dependent optical signal thus generated, wherein the temperature at the measuring point(s) is derivable from the temperature-dependent optical signal, the sensor arrangement being operable to measure temperature at the one or more measuring point(s) by:
emitting an optical signal by means of the transmitter unit, whereby the optical signal impinges on the quantum dots in a nanocomposite;
coupling of the light emitted by the quantum dots, which represents the temperature-dependent optical signal, or which generates the temperature dependent optical signal by superposition with the optical signal, into the connection arrangement;
conducting the temperature-dependent optical signal coupled into the connection arrangement to the receiver unit; and
receiving the temperature-dependent optical signal by means of the receiver unit in such a way that information about the temperature at one or more measuring point(s) can be derived from the temperature-dependent optical signal by the receiver unit;

and wherein the multimode quartz glass fiber comprises:
a) a fiber core of quartz glass,
b) the cladding layer, and
c) the nanocomposite, wherein the nanocomposite contains one or more UV-cured polymers and one or more types of quantum dots capable of emitting one or more central wavelengths;

and wherein the nanocomposite either
i) forms the cladding layer, wherein the cladding layer is applied directly onto the fiber core, wherein the nanocomposite has a lower refractive index at the central wavelength of the quantum dots or one of the central wavelengths than the quartz glass of the fiber core, at that central wavelength; or
ii) is formed as a front surface of an end of the quartz glass fiber or as a front surface between two sections of the quartz glass fiber.

8. The sensor arrangement of claim 7, wherein the nanocomposite comprises:
polymers in an amount of 80-99.5 weight percent based on the total weight of the nanocomposite,
quantum dots in an amount of 0.5-15 weight percent, based on the total weight of the nanocomposite,
optional additives in an amount of 0-10 weight percent based on the total weight of the nanocomposite.

9. The sensor arrangement of claim 7, wherein the polymer(s) are selected from the group consisting of fluoroacrylate-based polymers, urethane-acrylate-based polymers, fluorosiloxanes, epoxy-acrylate-based polymers, polyester-acrylate-based polymers, urethane-acrylate-based polymers, silicone-acrylate-based polymers, acrylic-acrylate-based polymers, polydimethylsiloxane, polyimide, fluorinated urethanes, and copolymers and mixtures thereof.

10. The sensor arrangement of claim 7, where the quantum dots contain combinations of group II-VI elements, III-V elements, and/or IV-VI elements of the periodic table.

11. The sensor arrangement of claim 7, further comprising a sheath applied directly to the cladding layer.

12. The sensor arrangement of claim 7, whereby the nanocomposite is formed as a front surface on one end of the quartz glass fiber and the nanocomposite, as well as an adjacent area of the multimode quartz glass fiber is arranged in a capillary.

13. The sensor arrangement of claim 7, whereby the nanocomposite is formed as a front face between two sections of the quartz glass fiber and the nanocomposite, as well as an adjacent area of the multimode quartz glass fiber is arranged in a capillary in both directions.

14. The sensor arrangement of claim 7, further comprising a computing unit connected to the receiver unit, which is configured to determine a temperature at the measuring point or points from the temperature-dependent optical signal.

15. The sensor arrangement of claim 7, further comprising a multimode quartz glass fiber branch which leads to a temperature measuring point, the temperature measuring point being formed with the nanocomposite layer in the quartz glass fiber, perpendicular to the fiber direction.

16. The sensor arrangement of claim 7, wherein the branch contains a coupler, the coupler being configured in such a way that the temperature dependent light signal, which propagates from the measuring point towards the branch, is conducted to the receiver unit.

17. The sensor arrangement of claim 7, wherein the receiver unit is configured to detect a wavelength between 560 and 1600 nm or 1300 and 1600 nm.

18. The sensor arrangement of claim 17, wherein the receiver unit is configured to detect a wavelength adapted for InP/ZnS quantum dots or InAs/InP quantum dots.

* * * * *